(12) United States Patent
Ha

(10) Patent No.: US 11,536,963 B2
(45) Date of Patent: Dec. 27, 2022

(54) OPTICAL DEVICE FOR AUGMENTED REALITY HAVING IMPROVED LIGHT EFFICIENCY

(71) Applicant: LETINAR CO., LTD, Seoul (KR)

(72) Inventor: Jeong Hun Ha, Seoul (KR)

(73) Assignee: LETINAR CO., LTD., Seoul (KR)

( * ) Notice: Subject to any disclaimer, the term of this patent is extended or adjusted under 35 U.S.C. 154(b) by 289 days.

(21) Appl. No.: 17/024,503

(22) Filed: Sep. 17, 2020

(65) Prior Publication Data

US 2021/0080729 A1 Mar. 18, 2021

(30) Foreign Application Priority Data

Sep. 18, 2019 (KR) .................. 10-2019-0114729
Dec. 24, 2019 (KR) .................. 10-2019-0173543

(51) Int. Cl.
*G02B 27/01* (2006.01)
*G02B 27/14* (2006.01)

(52) U.S. Cl.
CPC ....... *G02B 27/0172* (2013.01); *G02B 27/143* (2013.01); *G02B 2027/0118* (2013.01); *G02B 2027/0178* (2013.01)

(58) Field of Classification Search
CPC .............. G02B 27/0172; G02B 27/143; G02B 2027/0178; G02B 5/09; G02B 5/10; G02B 3/08
See application file for complete search history.

(56) References Cited

U.S. PATENT DOCUMENTS

| 2018/0149869 A1 | 5/2018 | Bergquist | |
|---|---|---|---|
| 2019/0064526 A1* | 2/2019 | Connor | G02B 6/0073 |
| 2019/0187541 A1* | 6/2019 | Yoshida | G03B 21/142 |
| 2020/0089004 A1* | 3/2020 | Connor | G02B 27/0176 |
| 2020/0183169 A1* | 6/2020 | Peng | G02B 6/0055 |
| 2020/0225400 A1* | 7/2020 | Stannard | G02B 6/0065 |

FOREIGN PATENT DOCUMENTS

| JP | 2017044853 A | 3/2017 |
|---|---|---|
| JP | 2018041096 A | 3/2018 |
| JP | 2019109435 A | 7/2019 |
| KR | 10-1660519 B1 | 9/2016 |
| KR | 1020180028339 A | 3/2018 |

* cited by examiner

*Primary Examiner* — Priyank J Shah
(74) *Attorney, Agent, or Firm* — Rabin & Berdo, P.C.

(57) ABSTRACT

Disclosed herein is an optical device for augmented reality having improved light efficiency. The optical device includes: a reflective means configured to transfer augmented reality image light to the pupil of a user by reflecting the augmented reality image light toward the pupil; and an optical means adapted such that the reflective means is embedded and disposed therein, and configured to transmit at least part of real object image light therethrough toward the pupil of the user. The optical means includes a first surface and a second surface. The reflective means includes a plurality of reflective units having a size of 4 mm or less that are embedded and arranged inside the optical means. At least two reflective units of the plurality of reflective units are arranged closer to the second surface of the optical means as the distance from the image output unit increases.

27 Claims, 31 Drawing Sheets

FIG. 7
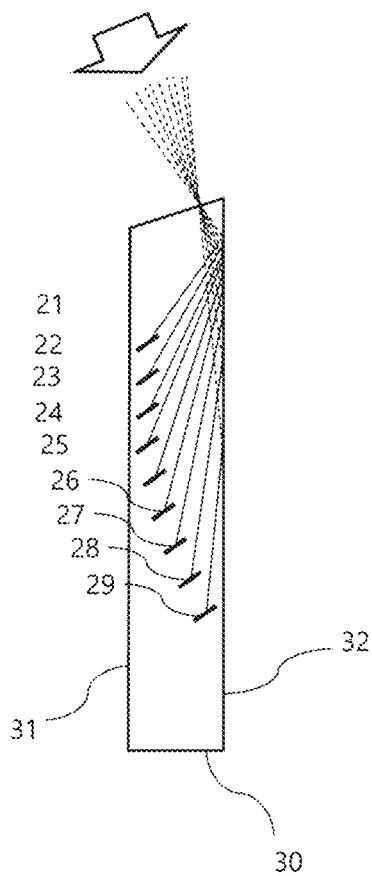
(a)
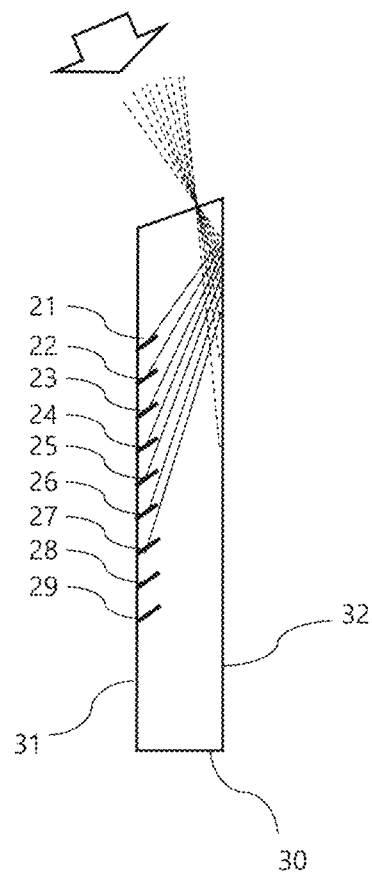
(b)

(a) θ=<45
(b) θ>45

20 ... 21, 22, 23, 24, 25, 26, 27, 28, 29
20A ... 21, 22, 23, 24
20B ... 25, 26, 27, 28, 29

FIG. 20
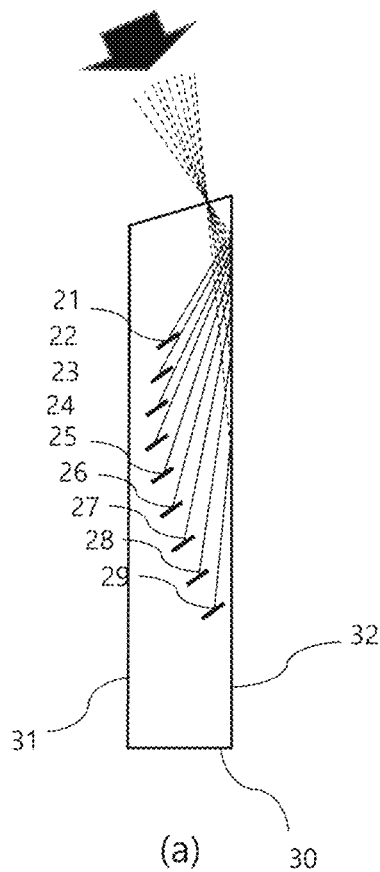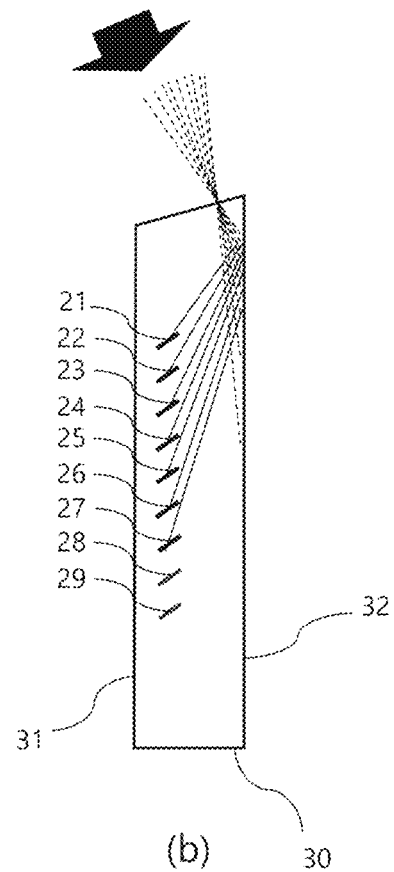

OPTICAL DEVICE FOR AUGMENTED REALITY HAVING IMPROVED LIGHT EFFICIENCY

CROSS-REFERENCE TO RELATED APPLICATION

This application claims the benefit of Korean Patent Application No. 10-2019-0114729 filed on Sep. 18, 2019 and No. 10-2019-0173543 filed on Dec. 24, 2019, which are hereby incorporated by reference herein in its entirety.

BACKGROUND

1. Technical Field

The present invention relates generally to an optical device for augmented reality, and more particularly to an optical device for augmented reality, in which the light efficiency of the augmented reality image light output from an image output unit and transmitted to the pupil is improved.

2. Description of the Related Art

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and a resulting image to be provided. As such an optical system, there is known a technology using an optical means such as a prism for reflecting or refracting a virtual image using a head-mounted display (HMD) or a glasses-type device.

FIGS. 1 and 2 show an example of an optical system that is used in a conventional apparatus for implementing augmented reality.

Referring to FIG. 1, a configuration is employed to allow augmented reality image light for the provision of a virtual image to be output from a display device (not shown), to be reflected from the inner surface of an optical means, and then to enter an eye box, which is a region where the pupil of a user is located. In this case, not all the augmented reality image light output from the inner surface (the exit pupil) of the optical means can enter the eye box, as shown in FIG. 1, and thus unused light is present. This leads to a factor that deteriorates light efficiency.

As shown in FIG. 2, when total reflection occurs inside the optical means, light in all directions is output from all locations of the exit pupil, so that part of the augmented reality image light entering the optical means appropriately enters the eye box (indicated by O) whereas part of the augmented reality image light is output in a direction other than the direction of the eye box (indicated by X).

As described above, the conventional apparatus for implementing augmented reality is problematic in that part of the augmented reality image light output from the image output unit is not transferred to the eye box, and thus this acts as a factor that decreases the light efficiency at which augmented reality image light is transferred to the pupil.

PRIOR ART DOCUMENT

Patent document 1: Korean Patent No. 10-1660519 (published on Sep. 29, 2016)

SUMMARY

The present invention has been conceived to overcome the above-described problems, and an object of the present invention is to provide an optical device for augmented reality, in which the light efficiency of the augmented reality image light transferred to an eye box is improved.

Another object of the present invention is to provide an optical device for augmented reality, in which a reflective means for transferring the augmented reality image light, output from an image output unit, to the pupil is formed a curved arrangement structure close to a C shape, so that the light efficiency of the augmented reality image light transferred to an eye box is improved.

According to an aspect of the present invention, there is provided an optical device for augmented reality having improved light efficiency, the optical device comprising: a reflective means configured to transfer augmented reality image light, which is image light corresponding to an image for augmented reality output from an image output unit, to a pupil of an eye of a user by reflecting the augmented reality image light toward the pupil, thereby providing the image for augmented reality to the user; and an optical means adapted such that the reflective means is embedded and disposed therein, and configured to transmit at least part of real object image light, which is image light output from a real object, therethrough toward the pupil of the eye of the user; wherein the optical means includes a first surface through which the augmented reality image light reflected from the reflective means and at least part of the real object image light go toward the pupil of the user and a second surface being opposite to the first surface and into which the real object image light enters; wherein the reflective means includes a plurality of reflective units having a size of 4 mm or less that are embedded and arranged inside the optical means to transfer the augmented reality image light, transferred to the reflective means, to the pupil of the user by reflecting the augmented reality image light; and wherein at least two reflective units of the plurality of reflective units are arranged closer to the second surface of the optical means as a distance from the image output unit increases.

Preferably, the augmented reality image light output from the image output unit is directly transferred to the reflective means through an inside of the optical means, or is totally reflected from an inner surface of the optical means at least once and then transferred to the reflective means.

Further, each of the plurality of reflective units may be inclined at an angle of 45 degrees or less with respect to a forward direction from a center of the pupil of the user.

Furthermore, a plurality of reflective means may be formed, and when the optical device for augmented reality is placed in front of the pupil of the user, assuming that a forward direction from the pupil is referred to as an x axis, any one of line segments being parallel to a vertical line between the image output unit and the x axis along the x axis and passing between the first and second surfaces of the optical means is referred to as an y axis and a line segment perpendicular to both the x axis and the y axis is referred to as an z axis, then each of the plurality of reflective means is arranged at intervals in parallel with each other along a z-axis direction.

The reflective means may be arranged such that each of reflective units included in each of the reflective means is located along a virtual straight line parallel to the z axis along with any one of reflective units included in adjacent reflective means.

The reflective means may be arranged such that each of reflective units included in each of the reflective means is prevented from being located along a virtual straight line parallel to the z axis along with any one of reflective units included in adjacent reflective means.

Preferably, the optical device for augmented reality is placed in front of the pupil of the user, assuming that a forward direction from the pupil is referred to as an x axis, any one of line segments being parallel to a vertical line between the image output unit and the x axis along the x axis and passing between the first and second surfaces of the optical means is referred to as an y axis and a line segment perpendicular to both the x axis and the y axis is referred to as an z axis, then each of the plurality of reflective units may be formed in bar shapes extending in a z-axis direction.

Further, at least some of the reflective units may have a different size.

Also, at least some of the reflective units may be arranged at intervals different from intervals at which other reflective units are arranged.

Furthermore, at least some of the reflective units may be composed of at least any one of half mirrors, refractive elements, and diffractive elements.

Further, at least some of the reflective units may have a surface coated with a material that absorbs light without reflecting light, wherein the coated surface is opposite surface to a surface reflecting the augmented reality image light.

Further, at least some of the reflective units may have surfaces formed as curved surfaces.

Further, the surfaces formed as curved surfaces may be concave toward the first surface of the optical means or convex toward the first surface of the optical means.

Preferably, when the reflective units are placed in front of the pupil of the user, assuming that a forward direction from the pupil is referred to as an x axis, any one of line segments being parallel to a vertical line between the image output unit and the x axis along the x axis and passing between the first and second surfaces of the optical means is referred to as an y axis and a line segment perpendicular to both the x axis and the y axis is referred to as an z axis, then at least some of the reflective units may be formed such that a length thereof in a z-axis direction is formed to be longer than a length thereof in an x-axis direction or such that a length thereof in a y-axis direction is formed to be longer than a length thereof in the z-axis direction.

Further, the reflective units formed such that the length thereof in the z-axis direction is formed to be longer than the length thereof in the x-axis direction or such that the length thereof in the y-axis direction is formed to be longer than the length thereof in the z-axis direction may have surfaces formed as concave toward the first surface of the optical means or as convex toward the first surface of the optical means.

According to another aspect of the present invention, there is provided an optical device for augmented reality having improved light efficiency, the optical device comprising: a reflective means configured to transfer augmented reality image light, which is image light corresponding to an image for augmented reality output from an image output unit, to a pupil of an eye of a user by reflecting the augmented reality image light toward the pupil, thereby providing the image for augmented reality to the user; and an optical means adapted such that the reflective means is embedded and disposed therein, and configured to transmit at least part of real object image light, which is image light output from a real object, therethrough toward the pupil of the eye of the user; wherein the optical means includes a first surface through which the augmented reality image light reflected from the reflective means and at least part of the real object image light go toward the pupil of the user, and a second surface being opposite to the first surface and into which the real object image light enters; wherein the reflective means includes a plurality of reflective units having a size of 4 mm or less that are embedded and arranged inside the optical means to transfer the augmented reality image light, transferred to the reflective means, to the pupil of the user by reflecting the augmented reality image light; wherein the reflective means includes a first reflective unit group comprising reflective units embedded and arranged inside the optical means so that the reflective units are arranged closer to the first surface of the optical means as a distance from the image output unit increases, and a second reflective unit group comprising reflective units embedded and arranged inside the optical means so that the reflective units are arranged farther from the first surface of the optical means as a distance from the image output unit increases; and wherein the first reflective unit group and the second reflective unit group are arranged such that a distance between the second reflective unit group and the image output unit is larger than a distance between the first reflective unit group and the image output unit.

Preferably, the augmented reality image light output from the image output unit may be directly transferred to the reflective means through an inside of the optical means, or may be totally reflected from an inner surface of the optical means at least once and then transferred to the reflective means.

Further, each of the plurality of reflective units may be inclined at an angle of 45 degrees or less with respect to a forward direction from a center of the pupil of the user.

Preferably, a plurality of reflective means may be formed; and when the optical device for augmented reality is placed in front of the pupil of the user, assuming that a forward direction from the pupil is referred to as an x axis, any one of line segments being parallel to a vertical line from the image output unit to the x axis along the x axis and passing between the first and second surfaces of the optical means is referred to as an y axis and a line segment perpendicular to both the x axis and the y axis is referred to as an z axis, then the each of the plurality of reflective means is arranged at intervals in parallel with each other along a z-axis direction.

Further, the reflective means may be arranged such that each of reflective units included in each of the reflective means is located along a virtual straight line parallel to the z axis along with any one of reflective units included in adjacent reflective means.

Further, the reflective means may be arranged such that each of reflective units included in each of the reflective means is prevented from being located along a virtual straight line parallel to the z axis along with any one of reflective units included in adjacent reflective means.

Furthermore, when the optical device for augmented reality is placed in front of the pupil of the user, assuming that a forward direction from the pupil is referred to as an x axis, any one of line segments being parallel to a vertical line between the image output unit and the x axis along the x axis and passing between the first and second surfaces of the optical means is referred to as an y axis and a line segment perpendicular to both the x axis and the y axis is referred to as an z axis, then each of the plurality of reflective units may be formed in bar shapes extending in a z-axis direction.

Further, at least some of the plurality of reflective units may be composed of at least any one of half mirrors, refractive elements, and diffractive elements.

Furthermore, at least some of the reflective units may have a surface coated with a material that absorbs light without reflecting light, wherein the coated surface is opposite surface to a surface reflecting the augmented reality image light.

Furthermore, at least some of the plurality of reflective units may have surfaces formed as curved surfaces.

Furthermore, when the optical device for augmented reality is placed in front of the pupil of the user, assuming that a forward direction from the pupil is referred to as an x axis, any one of line segments being parallel to a vertical line from the image output unit to the x axis along the x axis and passing between the first and second surfaces of the optical means is referred to as an y axis and a line segment perpendicular to both the x axis and the y axis is referred to as an z axis, then at least some of the plurality of reflective units may be formed such that a length thereof in a z-axis direction is formed to be longer than a length thereof in an x- or y-axis direction or such that a length thereof in the x- or y-axis direction is formed to be longer than a length thereof in the z-axis direction.

Further, the reflective units may have surfaces formed as concave toward the first surface of the optical means or as convex toward the first surface of the optical means.

Preferably, a plurality of reflective means are formed; and when the optical device for augmented reality is placed in front of the pupil of the user, assuming that a forward direction from the pupil is referred to as an x axis, any one of line segments being parallel to a vertical line from the image output unit to the x axis along the x axis and passing between the first and second surfaces of the optical means is referred to as an y axis and a line segment perpendicular to both the x axis and the y axis is referred to as an z axis, then there may be at least one reflective means that has a different distance to the first surface of the optical means.

BRIEF DESCRIPTION OF THE DRAWINGS

The above and other objects, features, and advantages of the present invention will be more clearly understood from the following detailed description taken in conjunction with the accompanying drawings, in which:

FIG. 7 shows diagrams illustrating the effects of structures in which reflective units are arranged;

FIG. 20 is a diagram illustrating the effect of the arrangement structure of the reflective units of the optical device for augmented reality according to the second embodiment of the present invention;

DETAILED DESCRIPTION

Embodiments of the present invention will be described in detail below with reference to the accompanying drawings.

First, the basic principle of the present invention will be briefly described with reference to patent document 1.

The technology described in patent document 1 as the prior art is intended to overcome the problems of the conventional apparatus for implementing augmented reality using an existing optical system as follows.

That is to say, the conventional apparatus for implementing augmented reality is problematic in that it is inconvenient for a user to wear because the structure thereof is complicated and thus the weight and volume thereof are increased and in that the manufacturing cost thereof is high because the manufacturing process thereof is also complicated.

Furthermore, the conventional apparatus for implementing augmented reality has a limitation in that a virtual image is out of focus when a user changes a focal distance while gazing at the real world. In order to overcome this problem, there have been proposed a technology using a configuration such as a prism capable of adjusting the focal distance of a virtual image and a technology electrically controlling a variable focus lens capable of changing the focal distance of a virtual image in response to a change in a focal distance to the real world. However, these technologies also have a problem in that to adjust the focal distance of a virtual image, a user needs to perform a separate operation, or hardware such as a separate physical device or processor and software are required.

Accordingly, through patent document 1, the applicant of the present invention proposed an apparatus for implementing augmented reality capable of significantly reducing the volume and weight thereof and simplifying the manufacturing process thereof by projecting a virtual image onto the retina through the pupil by using a reflective unit having a size smaller than that of the pupil of a human and also capable of always providing a clear virtual image regardless of whether or not a user changes a focal distance.

Figure 1:
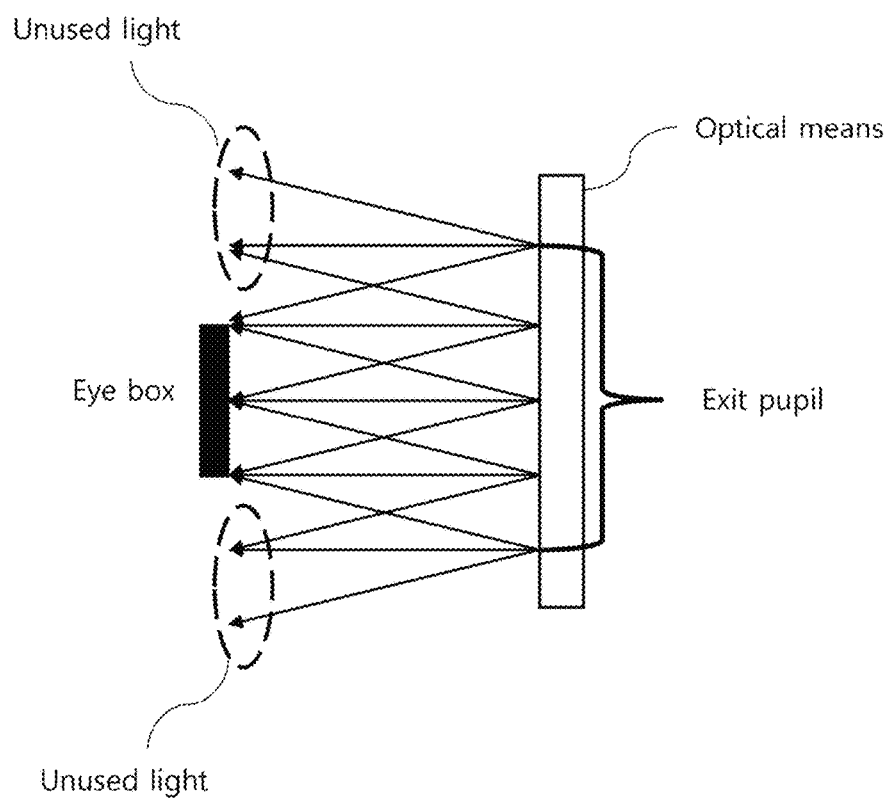
FIGS. 1 and 2 show an example of an optical system that is used in a conventional apparatus for implementing augmented reality.
Figure 2:
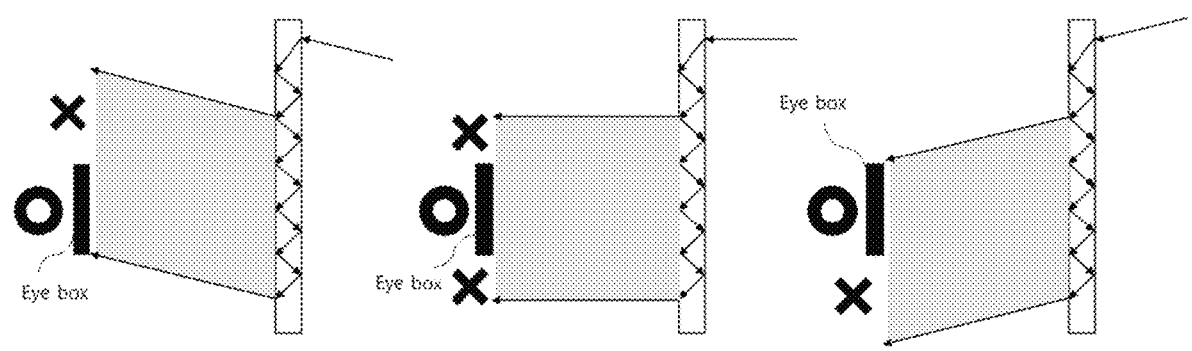
Figure 3:
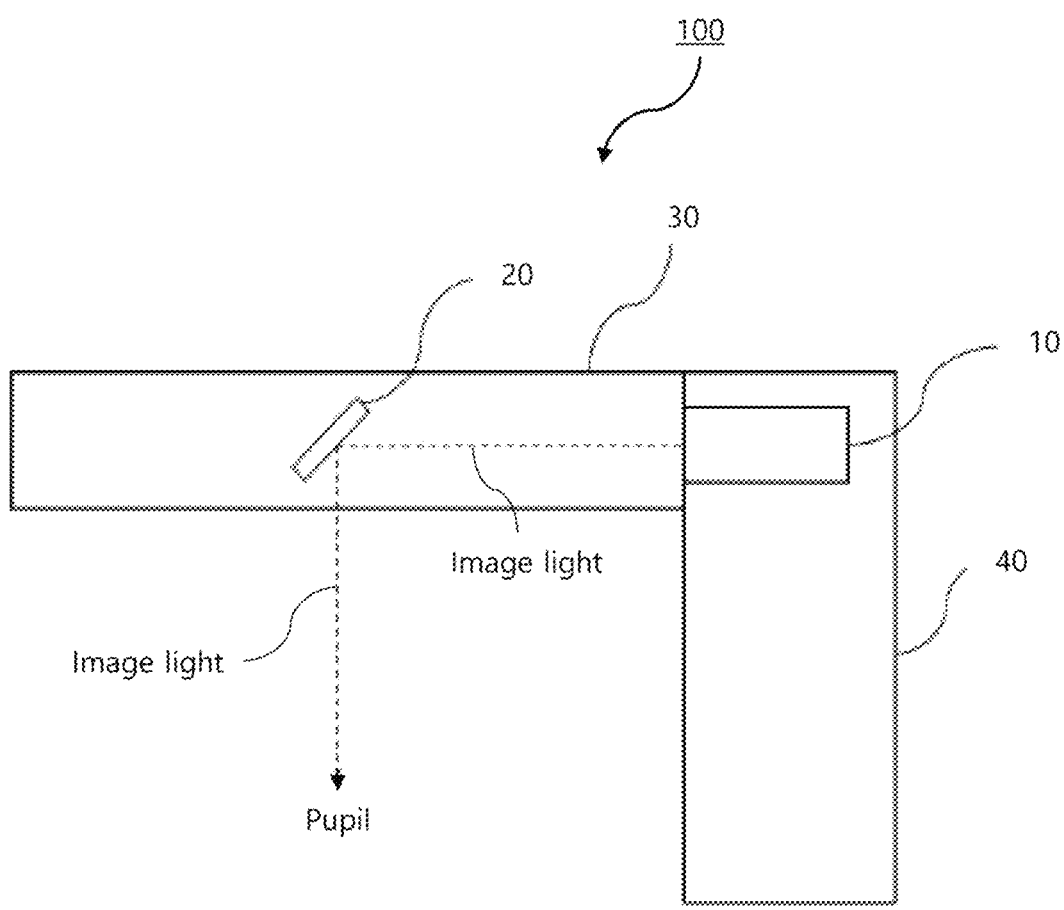
FIG. 3 is a diagram showing an optical device 100 for augmented reality such as that disclosed in patent document 1.

FIG. 3 is a diagram showing an optical device 100 for augmented reality such as that disclosed in patent document 1.

The optical device 100 for augmented reality shown in FIG. 3 includes an image output unit 10, a reflective unit 20, and an optical means 30.

The image output unit 10 is a means for outputting augmented reality image light corresponding to an image for augmented reality, and may be implemented as, for example, a small-sized display device.

The reflective unit 20 provides an image for augmented reality to a user by reflecting augmented reality image light, output from the image output unit 10, to the pupil of the user. The reflective unit 20 is embedded and disposed inside the optical means 30 at an appropriate angle between the image output unit 10 and the pupil so that it can reflect image light corresponding to an image for augmented reality, output from the image output unit 10, to the pupil.

The optical means 30 is a means for transmitting at least part of real object image light, which is image light output from a real object (an object of real world), and may be, for example, a lens of eyeglasses. The reflective unit 20 is embedded inside the optical means 30.

A frame unit 40 is a means for fastening and supporting both the image output unit 10 and the optical means 30, and may be constructed, for example, in the form of eyeglasses.

The reflective unit 20 shown in FIG. 3 is formed to have a size smaller than that of the average of pupil of humans, i.e., 8 mm or less. By forming the reflection unit 20 smaller than the average pupil of humans as described above, the depth of field for light entering the pupil through the reflection unit 20 may be made almost infinite, i.e., considerably deep.

In this case, the depth of field refers to a range within which an image for augmented reality is recognized as being in focus. When the depth of field increases, this means that a focal distance for an image for augmented reality increases. Accordingly, even when a user changes the focal distance for the real world while gazing at the real world, an image for augmented reality is always recognized as being in focus regardless of such a change. This may be a kind of pinhole effect.

Accordingly, the optical device 100 for augmented reality shown in FIG. 3 may always provide a clear virtual image for an image for augmented reality even when a user changes the focal distance while gazing at a real object in the real world.

The present invention is characterized by providing an optical device for augmented reality based on the technology described in patent document 1. Optical devices 200 to 1300 for augmented reality having improved light efficiency according to the present invention will be described in detail below with reference to FIGS. 4 to 34.

First Embodiment

Figure 4:
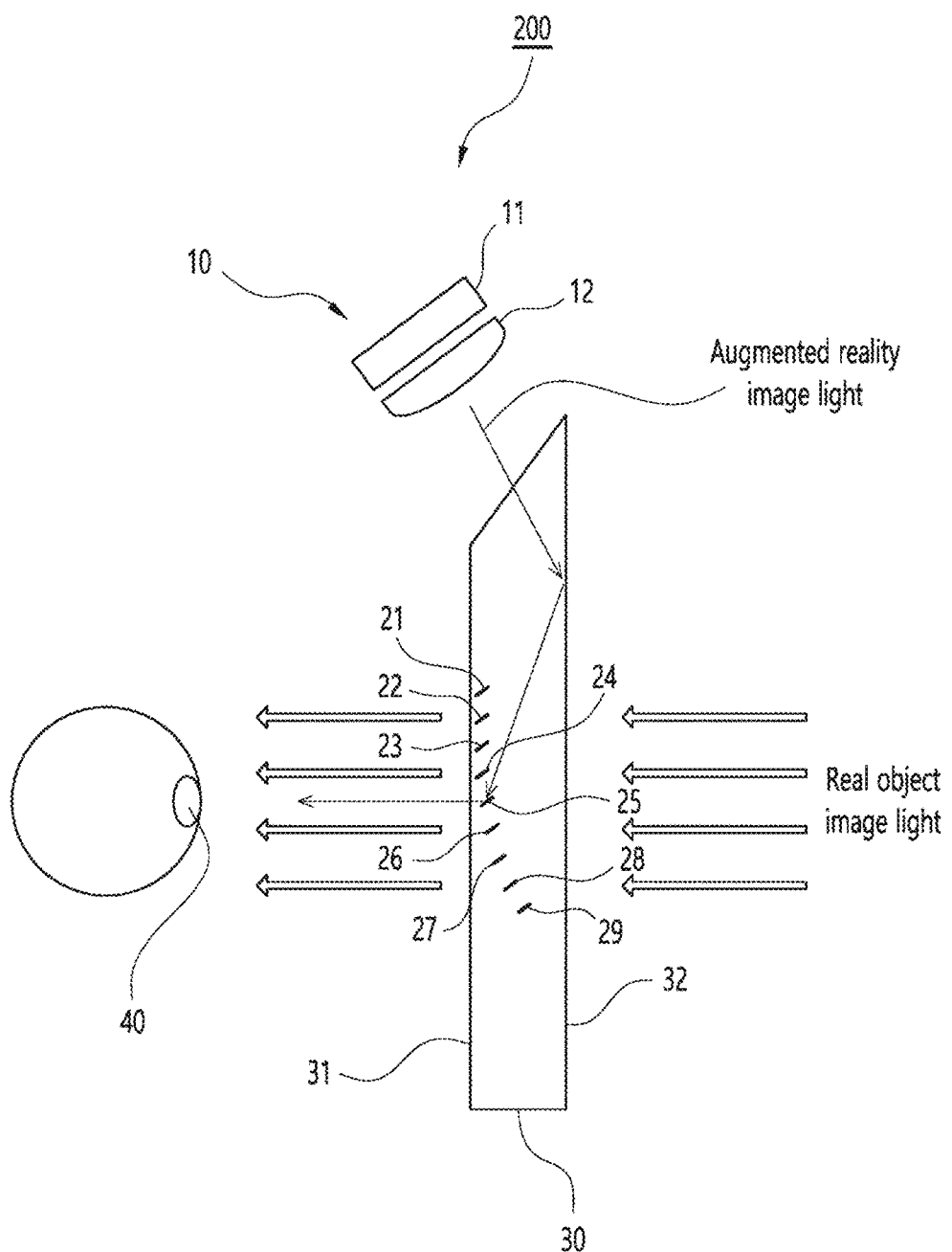
FIG. 4 is a diagram showing an optical device for augmented reality having improved light efficiency according to a first embodiment of the present invention.

FIG. 4 is a diagram showing an optical device 200 for augmented reality having improved light efficiency according to a first embodiment of the present invention.

Referring to FIG. 4, the optical device 200 for augmented reality having improved light efficiency (hereinafter simply referred to as the "optical device 200 for augmented reality") includes a reflective means 20 and an optical means 30.

The image output unit 10 is a means for outputting augmented reality image light, which is image light corresponding to an image for augmented reality, toward the optical means 30. For example, the image output unit 10 may include: a display device 11, such as a small-sized LCD, configured to output augmented reality image light through a screen by displaying an image for augmented reality on the screen; and a collimator 12 configured to output light obtained by collimating the augmented reality image light output from the display device 11.

The collimator 12 is not essential, and may be omitted. Furthermore, there may be used other various optical elements that are each composed of a combination of the collimator 12, and at least any one of a reflective means, a refractive means and a diffractive means that reflect, refract or diffract augmented reality image light output from the display device 11 and transfer the light toward the optical means 30.

Since the image output unit 10 itself is not a direct target of the present invention and has been known in the prior art, a detailed description thereof will be omitted below.

Meanwhile, the image for augmented reality refers to a virtual image that is displayed on the screen of the display device 11 of the image output unit 10 and transferred to the pupil 40 of a user through the reflective means 20 and the optical means 30. The image for augmented reality may be a still image or moving image in the form of an image.

Such an image for augmented reality is output from the image output unit 10 as augmented reality image light corresponding to the image for augmented reality, and is transferred to the pupil 40 of a user through the reflective means 20 and the optical means 30, thereby providing a virtual image to the user. At the same time, user receives real object image light, which is image light output from a real object present in the real world, directly through the eye via the optical means 30, so that an augmented reality service can be provided to the user.

In the embodiment of FIG. 4, there is shown a configuration in which total reflection occurs once on an inner surface of the optical means 30. Accordingly, the image output unit 10 is disposed at a position shown in FIG. 4, but this is an example. When a total reflection structure is not employed or when total reflection is employed twice or more, the image output unit 10 is disposed accordingly at a position appropriate to transfer augmented reality image light to the reflective means 20 through the optical means 30. In any case, the image output unit 10 may be disposed at an appropriate position by taking into consideration the position and angle of the reflective means 20 and the position of the pupil 40 to be described later.

The reflective means 20 is a means for transferring augmented reality image light, corresponding to an image for augmented reality output from the image output unit 10, to the pupil 40 of the eye of a user by reflecting the augmented reality image light toward the pupil 40, thereby providing the image for augmented reality, which is a virtual image, to the user.

In FIG. 4, the reflective means 20 includes a plurality of reflective units 21 to 29, and reference symbol 20 designates the entirety of the plurality of reflective units 21 to 29.

The reflective means 20 is embedded and disposed inside the optical means 30, as shown in FIG. 4.

As will be described later, the optical means 30 includes a first surface 31 through which the augmented reality image light reflected from the reflective means 20 and at least part of real object image light go toward the pupil 40 of the user, and a second surface 32 being opposite to the first surface 31 and into which the real object image light enters. The reflective means 20 is embedded and disposed in an internal space between the first and second surfaces 31 and 32 of the optical means 30.

The first surface 31 of the optical means 30 is a surface facing the pupil 40 of the user when the user places the optical device 200 for augmented reality in front of the pupil 40, and the second surface 32 thereof is the opposite surface, i.e., a surface facing an object in the real world. The reflective means 20 is disposed in an internal space between the first and second surfaces 31 and 32 of the optical means 30.

Meanwhile, although the augmented reality image light output from the image output unit 10 is illustrated as being totally reflected from the inner surface of the optical means 30 once and then transferred to the reflective means 20 in the embodiment of FIG. 4, this is an example.

The augmented reality image light output from the image output unit 10 may be directly transferred to the reflective means 20 through the inner space of the optical means 30 without employing total reflection, or may be totally reflected by the inner surface of the optical means 30 at least twice and then transferred to the reflective means 20.

In the case where augmented reality image light is totally reflected by the inner surface of the optical means 30 at least twice and the number of total reflections is an even number (2n, where n is a natural number), the augmented reality image light output from the image output unit 10 enters the first surface 31 firstly rather than the second surface 32 of the optical means 30 as shown in FIG. 4, is totally reflected 2n times between the second surface 32 and the first surface 31, and is then transferred to the reflective means 20. Accordingly, in this case, the augmented reality image light output from the image output unit 10 is output toward the first surface 31, unlike in FIG. 4.

In the case where augmented reality image light is totally reflected at the inner surface of the optical means 30 at least twice and the number of total reflections is an odd number (2n−1, where n is a natural number), the augmented reality image light output from the image output unit 10 enters the second surface 32 of the optical means 30 like in FIG. 4, is totally reflected 2n−1 times between the first surface 31 and the second surface 32, and is then transferred to the reflective means 20.

In the case of configurations employing total reflection, in any case, the augmented reality image light entering the reflective means 20 comes from the second surface 32 of the optical means 30.

In the embodiment of FIG. 4, the reflective means 20 includes a plurality of reflective units 21 to 29, and the reflective units 21 to 29 are appropriately disposed inside the optical means 30 by taking into consideration the locations of the image output unit 10 and the pupil 40 in order to transfer the augmented reality image light transferred to the reflective units 21 to 29 to the pupil 40 of the user by reflecting the augmented reality image light.

As shown in FIG. 4, in the case where there is employed a configuration in which the augmented reality image light output from the image output unit 10 is totally reflected by the second surface 32 of the optical means 30 and then transferred to the reflective units 21 to 29, the inclination angles of the reflective units 21 to 29 are accordingly set by taking into consideration the location the augmented reality image light entering the second surface 32 of the optical means 30 from the image output unit 10, the augmented reality image light totally reflected by the second surface 32 and output to the reflective units 21 to 29, and the pupil 40.

Meanwhile, each of the reflective units 21 to 29 is preferably formed to have a size smaller than that of the pupil of a human, i.e., 8 mm or less, more preferably 4 mm or less, so that a pinhole effect may be achieved by increasing the depth of field, as described with reference to FIG. 3 above.

In other words, each of the reflective units 21 to 29 is preferably formed to have a size smaller than that of the average pupil of humans, i.e., 8 mm or less, more preferably 4 mm or less. By this, the depth of field for the light entering the pupil through each of the reflective units 21 to 29 may be made almost definite, i.e., considerably deep. Accordingly, a pinhole effect that allows an image for augmented reality to be recognized as being in focus at any time may be achieved, regardless of a change of the focal distance which may happen when a user changes the focal distance for the real world while gazing at the real world and.

In this case, the size of each of the reflective units 21 to 29 is defined to mean the maximum length between any two points on the edge boundary of each of the reflective units 21 to 29.

Furthermore, the size of each of the reflective units 21 to 29 may be the maximum length between any two points on the edge boundary of an orthogonal projection obtained by projecting each of the reflective units 21 to 29 onto a plane that is perpendicular to straight lines between the pupil 40 and the reflective units 21 to 29 and includes the center of the pupil 40.

Meanwhile, when the reflective units 21 to 29 are 2 or more in number, as shown in FIG. 4, each of the reflective units 21 to 29 needs to be arranged so as not to prevent the augmented reality image light totally reflected by the second surface 32 of the optical means 30 from being transferred to other reflective units 21 to 29.

For this purpose, in the present embodiment, at least two reflective units 25 to 29 of the plurality of reflective units 21 to 29 are arranged closer to the second surface 32 of the optical means 30 as the distance from the image output unit 10 increases. In other words, this means that at least two reflective units 25 to 29 of the plurality of reflective units 21 to 29 are arranged father from the first surface 31 of the optical means 30, i.e., the pupil 40, as the distance from the image output unit 10 increases.

In this case, there may be a case where the second surface 32 of the optical means 30 is formed as a curved surface or is disposed at an inclination angle with respect to the pupil 40. Accordingly, the fact that at least two reflective units 25 to 29 of the plurality of reflective units 21 to 29 are arranged closer to the second surface 32 of the optical means 30 as the distance from the image output unit 10 increases means that there are at least two reflective units 25 to 29 of the reflective units 21 to 29 that are closer to a plane perpendicular to a straight line in a forward direction from the pupil 40 and including a point at which the straight line meets the second surface 32 of the optical means 30 as the distance from the image output unit 10 increases.

Figure 5:
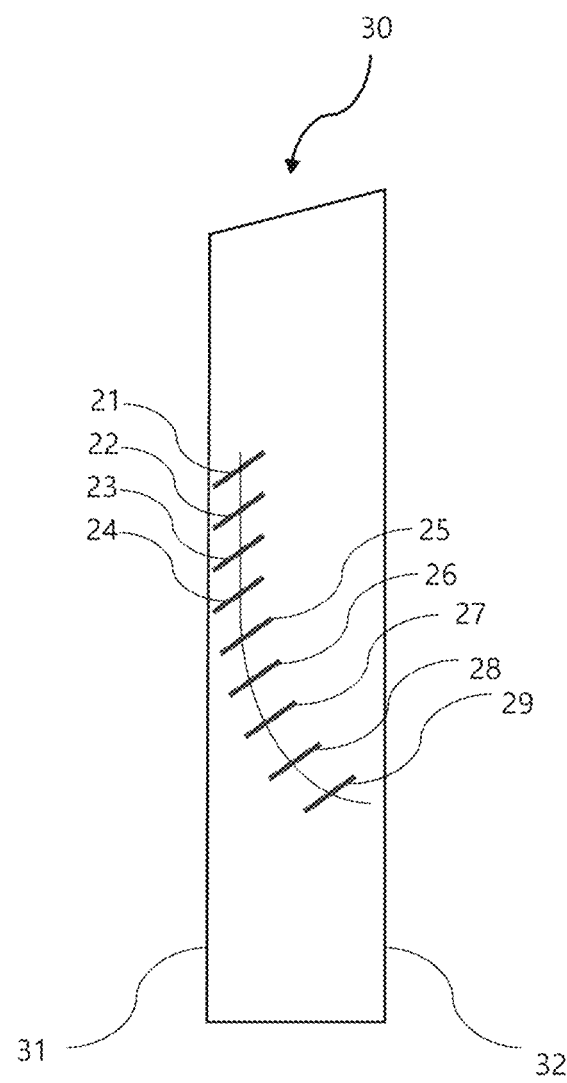
FIG. 5 is a diagram illustrating a structure in which reflective units are arranged.

FIG. 5 is a diagram illustrating a structure in which reflective units 21 to 29 are arranged.

Referring to FIG. 5, the reflective units 21 to 29 are embedded and arranged between the first and second surfaces 31 and 32 of an optical means 30. When the optical means 30 is viewed from the side, the reflective units 21 to 24 have the same distance to the second surface 32 of the optical means 30, whereas the reflective units 25 to 29 are arranged closer to the second surface 32 of the optical means 30 as the distance from the image output unit 10 increases.

In FIG. 5, when the optical means 30 is viewed from the side, the reflective units 21 to 24 are arranged such that a virtual line connecting the centers of the reflecting units 21 to 24 forms a straight line parallel to the second surface 32 and the reflective units 25 to 29 are arranged such that a virtual line connecting the centers of the reflecting units 25 to 29 forms a curved line. In other words, the reflective units 21 to 24 are arranged along a straight line, and the reflective units 25 to 29 are arranged along a curved line.

Although the four reflective units 21 to 24 are illustrated as being arranged along a straight line and the five reflective units 25 to 29 are illustrated as being arranged along a curved line in FIG. 5, this is an example. It is obvious that the number of reflective units arranged along each of the straight and curved lines may be changed according to their example of use. Alternatively, all reflective units 21 to 29 may be arranged along a curved line.

In this case, the straight and curved lines are shapes in a two-dimensional (2D) plane when viewed from the side of the optical means 30. However, when the image output unit 10 is located on the side of the pupil 40 rather than being located above the pupil 40 as shown in FIG. 4, the reflective units 21 to 29 may be arranged along a straight or curved line in a 2D plane when viewed from a position above or below the optical means 30.

Figure 6:
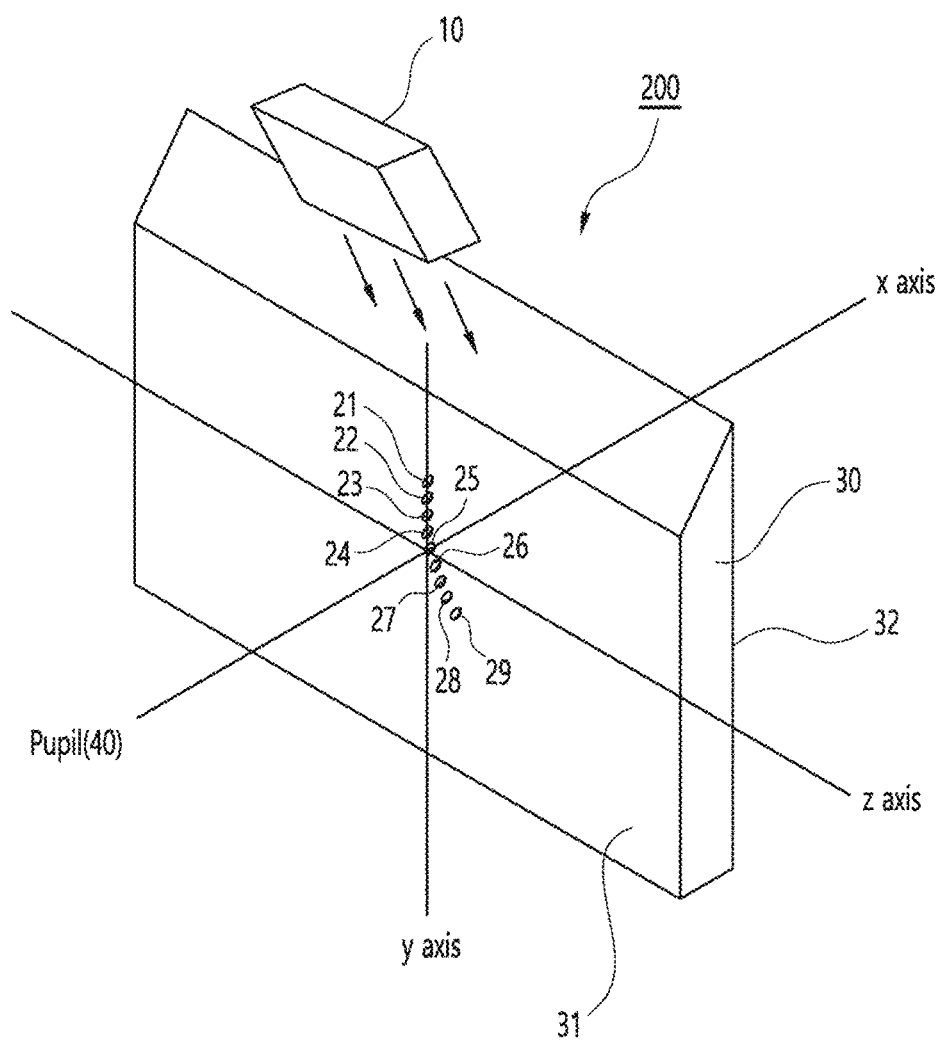
FIG. 6 is a perspective view of the optical device for augmented reality, which is illustrated in FIGS. 4 and 5.

FIG. 6 is a perspective view of the optical device 200 for augmented reality, which is illustrated in FIGS. 4 and 5.

Referring to FIG. 6, when the optical device 200 for augmented reality is placed in front of the pupil 40 of a user, let's assume that a forward direction from the pupil 40 is referred to as an x axis, any one of line segments being parallel to a vertical line between the image output unit 10 and the x axis along the x axis and passing between the first and second surfaces 31 and 32 of the optical means 30 is referred to as an y axis, and a line segment perpendicular to both the x axis and the y axis is referred to as an z axis. Then, the reflective units 21 to 29 are seen as shown in FIG. 5 when the optical device 200 for augmented reality is viewed toward a plane perpendicular to the z axis.

In other words, when the optical means 30 is viewed toward a plane perpendicular to the z axis from outside, at least two reflective units 25 to 29 among the plurality of reflective units 21 to 29 are arranged closer to the second surface 32 of the optical means 30 in an internal space between the first and second surfaces 31 and 32 of the optical means 30 as the distance from the image output unit 10 increases.

In this case, the plurality of reflective units 21 to 29 may be arranged in a plane perpendicular to the z axis in spaces between the first and second surfaces 31 and 32 of the optical means 30.

Meanwhile, as shown in FIGS. 5 and 6, it can be seen that the reflective units 21 to 24 are arranged closer to the first surface 31 of the optical means 30.

In this case, the second surface 32 is a surface that is entered by real object image light, as described above. This surface is a surface from which augmented reality image light is finally totally reflected immediately before entering the reflective units 21 to 29 when a total reflection structure is employed.

Meanwhile, it can be seen that the reflective units 25 to 29 are arranged in a curved shape so as to be closer to the second surface 32 of the optical means 30 in a direction toward the bottom one of the reflective units 25 to 29. In other words, the reflective units 25 to 29 are arranged closer to the second surface 32 as the distance from the image output unit 10 increases.

FIG. 7 shows diagrams illustrating the effects of structures in which reflective units 21 to 29 are arranged.

FIG. 7(a) shows a case where the reflective units 21 to 29 are arranged in a structure such as that shown in FIGS. 4 to 6, i.e., a structure in which at least two of the reflective units 25 to 29 are arranged closer to the second surface 32 as the distance from the image output unit 10 increases, and FIG. 7(b) shows a case where all the reflective units 21 to 29 are arranged in a straight line, i.e., all the reflective units 21 to 29 are arranged to have the same distance to the second surface 32 regardless of the distance from the image output unit 10.

Referring to FIG. 7(b), all the reflective units 21 to 29 are arranged along a straight line in a direction perpendicular to a forward direction from the pupil 40 (in other words, all the reflective units 21 to 29 are arranged to have the same distance to the second surface 32 of the optical means 30 regardless of the distance from the image output unit 10). In this case, it can be seen that the augmented reality image light totally reflected from the second surface 32 of the optical means 30 does not appropriately reach the lower reflective units 28 and 29.

In contrast, referring to FIG. 7(a), the reflective units 25 to 29 are arranged closer to the second surface 32 of the optical means 30 as the distance from the image output unit 10 increases. Accordingly, in this case, it can be seen that the augmented reality image light totally reflected from the second surface 32 of the optical means 30 is transferred to all the lower reflective units 28 and 29.

Meanwhile, the reflective units 21 to 29 are arranged to be inclined at an appropriate inclination angle in order to transfer the augmented reality image light, transferred to the reflective units 21 to 29, to the pupil 40 of user by reflecting the augmented reality image light, as described above. Each of the reflective units 21 to 29 is arranged to have an inclination angle of at least 45 degrees or less with respect to a forward direction from the center of the pupil 40 of the user.

Figure 8:
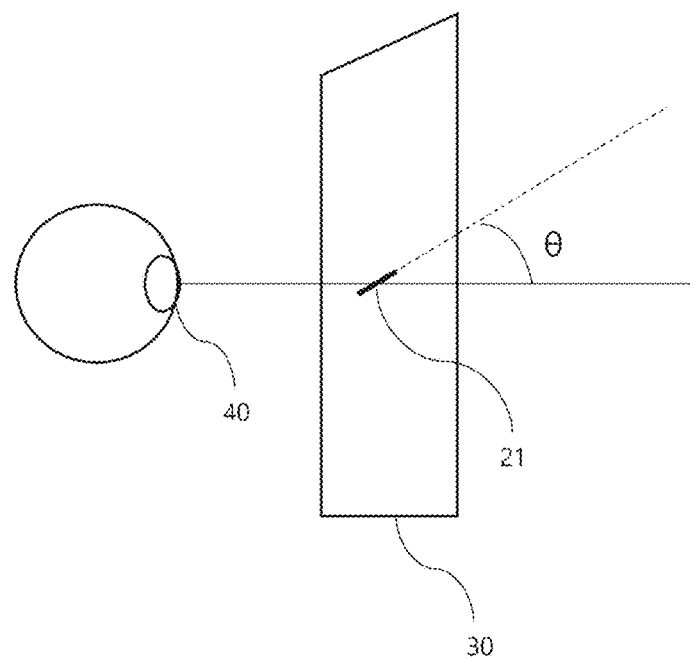
FIGS. 8 and 9 are diagrams illustrating the inclination angles of reflective units.
Figure 9:
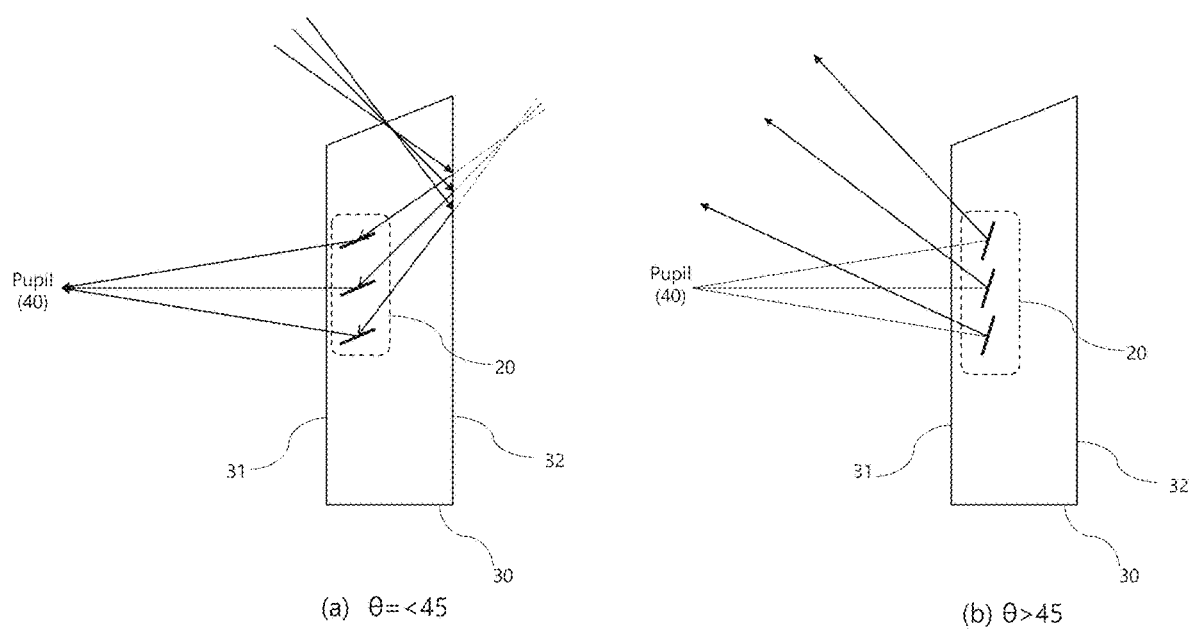

FIGS. 8 and 9 are diagrams illustrating the inclination angles of reflective units.

In FIG. 8, only one reflective unit 21 is shown for ease of description. Referring to FIG. 8, the reflective unit 21 is arranged to be inclined at an inclination angle θ with respect to a forward direction from the center of the pupil 40 of the user. This inclination angle is preferably 45 degrees or less. The reason for this is that when the inclination angle θ of the reflecting unit 21 exceeds 45 degrees, the augmented reality image light entering the reflective unit 21 may not be appropriately transferred toward the pupil 40.

FIG. 9(*a*) shows a case where the inclination angle θ of the reflector 20 is 45 degrees or less, and FIG. 9(*b*) shows a case where the inclination angle θ of the reflector 20 exceeds 45 degrees.

Referring to FIG. 9(*a*), the inclination angle θ of the reflective unit 20 is formed to be 45 degrees or less. In this case, it can be seen that the augmented reality image light totally reflected from the second surface 32 (the input surface) of the optical means 30 converges to the pupil 40 through the reflective unit 20.

In FIG. 9 (*a*), the dotted lines marked outside the second surface 32 of the optical means 30 are shown by extending the rays of augmented reality image light, totally reflected from the second surface 32 of the optical means 30 and entering the reflective units 20, out of the second surface 32 of the optical means 30. It can be seen that these dotted lines meet at a point outside the second surface 32 of the optical means 30. This means that the rays of augmented reality image light transmitted to the pupil 40 through the reflective units 20 converge to the pupil 40.

Meanwhile, as shown in FIG. 9(*b*), it can be seen that when the inclination angle θ of the reflective units 20 exceeds 45 degrees, image light diverges through the reflective units 20 without converging if it is assumed that the image light is output from the pupil 40. Accordingly, when a case where augmented reality image light is output from the image output unit 10 is taken into consideration, it means that the optical paths of the augmented reality image light cannot converge to the pupil 40 and thus may not have an input surface at the same position. Finally, this means that the augmented reality image light output from the image output unit 10 may not be appropriately transferred to the pupil 40 through the reflective units 20 after being totally reflected from the inner surface of the optical means 30.

Although FIG. 9 illustrates the case where augmented reality image light is totally reflected from the second surface 32 of the optical means 30 once, the same is true when total reflection is not employed or total reflection is employed twice or more. When total reflection is not employed, the image output unit 10 is located on second surface-side extension lines of lines, connecting the second surface 32 of the optical means 30 and the reflective units 20. Likewise, in this case, the reflective units 20 have an angle of at least 45 degrees or less with respect to a forward direction from the center of the pupil 40 of the user.

Meanwhile, the optical means 30 is a means that has reflective units 21 to 29 embedded and arranged therein and transmits at least part of real object image light, which is image light output from a real object, therethrough toward the pupil 40 of the eye of a user.

In this case, the fact that at least part of real object image light is transmitted toward the pupil 40 means that the light transmittance of real object image light does not necessarily have to be 100%.

Furthermore, as described above, the optical means 30 directly transfers the augmented reality image light, output from the image output unit 10, to the reflective units 21 to 29 through the inside of the optical means 30, or transfers the augmented reality image light, output from the image output unit 10, to the reflective units 21 to 29 after totally reflecting the augmented reality image light on the inner surface of the optical means 30 at least once.

As described above, the optical means 30 includes the first surface 31 through which the augmented reality image light reflected from the reflective units 21 to 29 and at least part of real object image light go toward the pupil 40 of a user, and the second surface 32 being opposite to the first surface 31 and to be entered by real object image light. The reflective units 21 to 29 are embedded and arranged in an internal space between the first and second surfaces 31 and 32 of the optical means 30.

The optical means 30 may be composed of a lens made of glass material, plastic material, or other synthetic resin materials, and may have various refractive indices and transparency.

Although the first and second surfaces 31 and 32 of the optical means 30 are shown as being parallel to each other, this is an example, and they may be configured not to be parallel to each other.

Furthermore, at least any one of the first and second surfaces 31 and 32 of the optical means 30 may be formed as a curved surface. In other words, any one of the first and second surfaces 31 and 32 may be formed as a curved surface, and both the first and second surfaces 31 and 32 may be formed as curved surfaces.

In this case, the curved surface may be a concave surface or a convex surface. The concave surface means that when a corresponding surface is viewed from the front, the central portion thereof is formed thinner than the edge portion thereof and become concave. The convex surface means that when a corresponding surface is viewed from the front, the central portion is formed thicker than the edge portion thereof and protrudes convexly.

Figure 10:
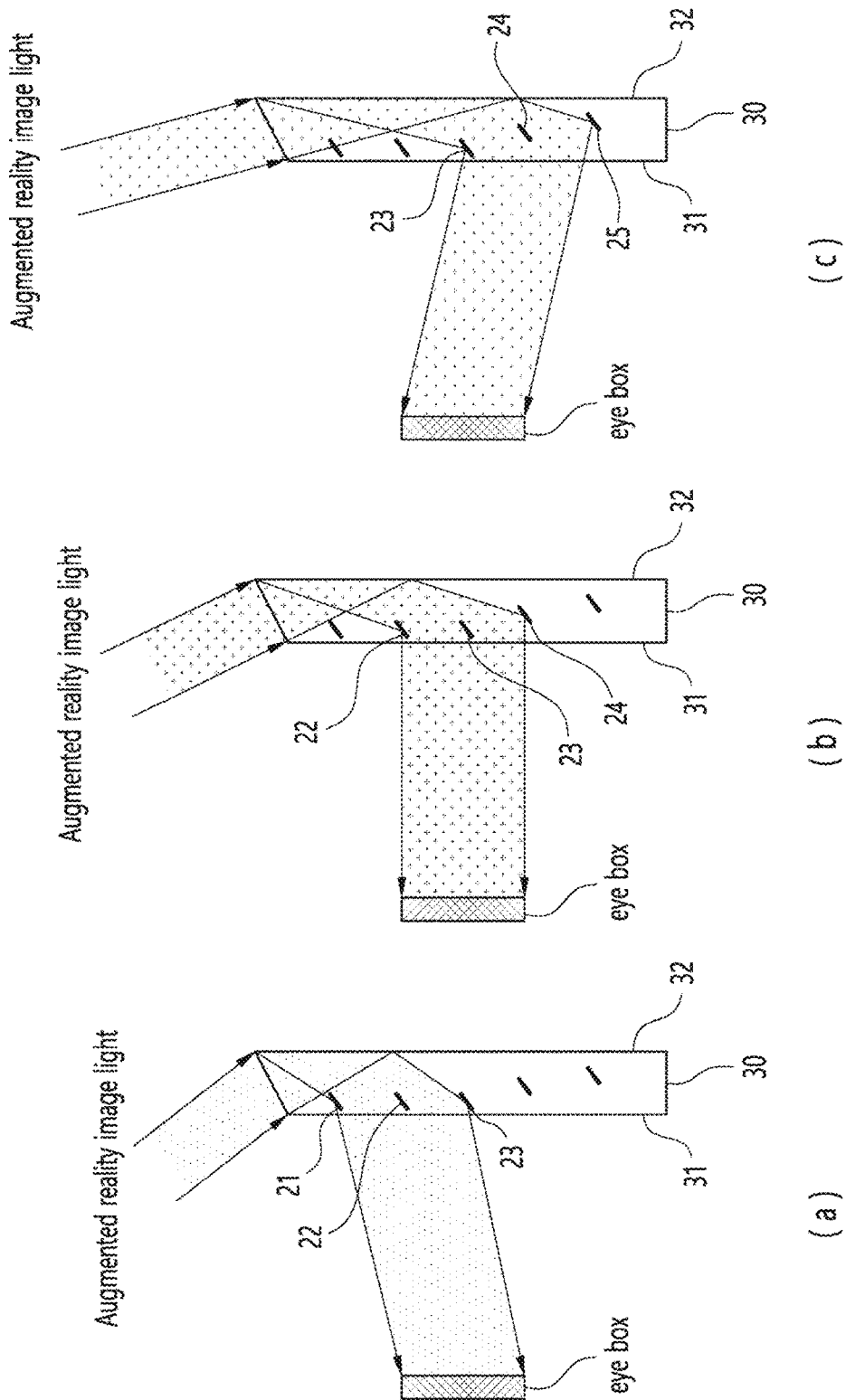
FIGS. 10 and 11 are diagrams illustrating the overall operation of the optical device for augmented reality according to the first embodiment of the present invention.
Figure 11:
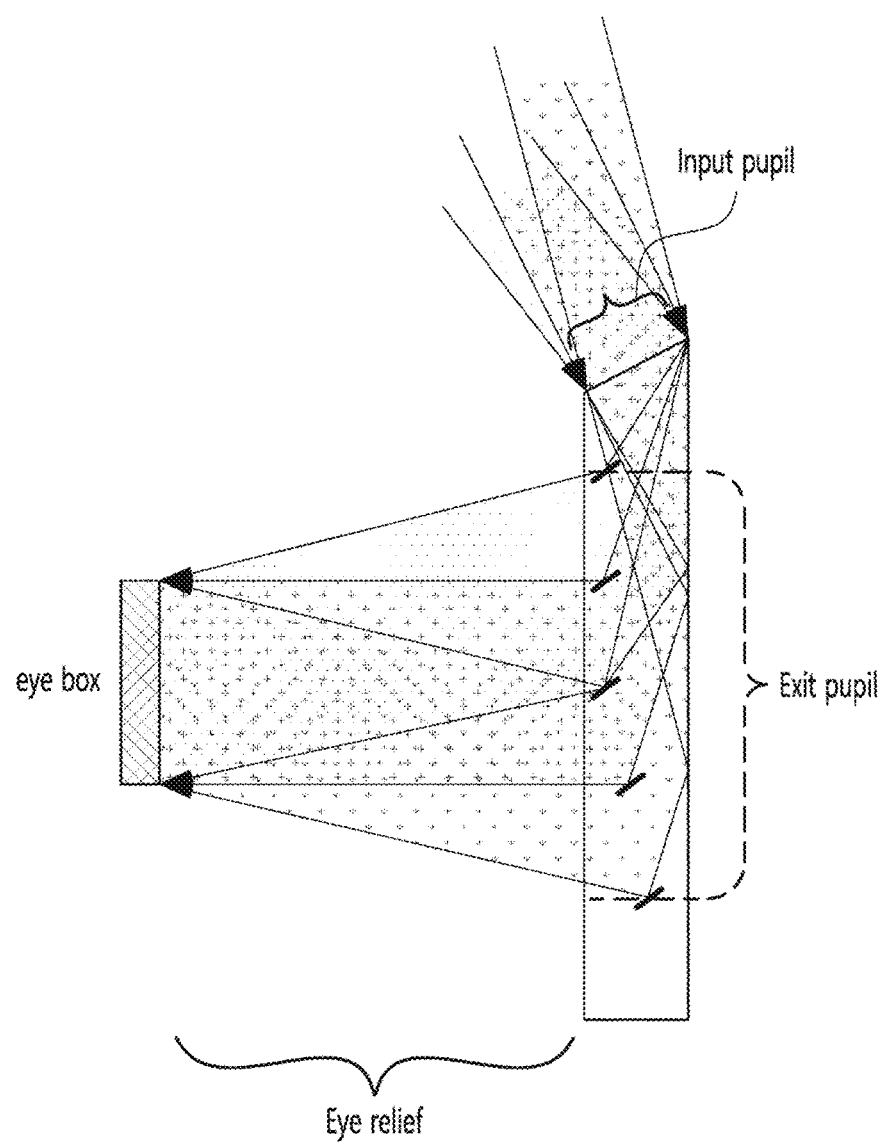

FIGS. 10 and 11 are diagrams illustrating the overall operation of the optical device 200 for augmented reality according to the embodiment described with reference to FIGS. 4 to 9, and are directed to a case where there is employed a total reflection structure such as that shown in FIG. 4.

In FIG. 10, only five reflective units 21 to 25 are shown for ease of description.

Referring to FIGS. 10(*a*), 10(*b*), and 10(*c*), it can be seen that rays of augmented reality image light entering at different angles are totally reflected from the second surface 32 of the optical means 30 and are transferred to an eye box by the reflective units 21 to 25 having the above-described inclination angle and arrangement structure.

The reflective units 21 to 23 are being used in FIG. 10(*a*), the reflective units 22 to 24 are being used in FIG. 10(*b*), and the reflective units 23 to 25 are being used in FIG. 10(*c*). It can be seen that these reflective units transfer augmented reality image light to an eye box at an angle corresponding to the incident angle of the light path of the augmented reality image light, i.e., the exit angle of the light path of the augmented reality image light output from the image output unit 10.

In this case, the eye box is the maximum space in which the pupil 40 of the user can be located in viewing augmented reality image light as it is output from the image output unit 10. The second surface 32 of the optical means 30 acts as an input surface, and the augmented reality image light totally reflected from the input surface is all output in the direction of the eye box through the reflective units 21 to 25.

Meanwhile, FIG. 11 shows the rays of augmented reality image light shown in FIGS. 10(a), 10(b), and 10(c) together. Referring to FIG. 11, it can be seen that the augmented reality image light output from the image output unit 10 enters through the upper portion of the optical means 30 acting as an input pupil, is totally reflected through the second surface 32 of the optical means 30, is reflected through the reflective units 20, and is then transferred to the eye box through the first surface 31 of the optical means acting as an exit pupil. In this case, the distance between the eye box where the pupil 40 can be located and the optical means 30 becomes an eye relief.

As shown in FIGS. 10 and 11, it can be seen that the augmented reality image light output from the image output unit 10 and totally reflected from the input surface of the optical means 30 is all transferred toward the eye box by the inclination angle and arrangement structures of the reflective units 20 such as those described above, and thus the light efficiency of augmented reality image light may be considerably improved.

Figure 12:
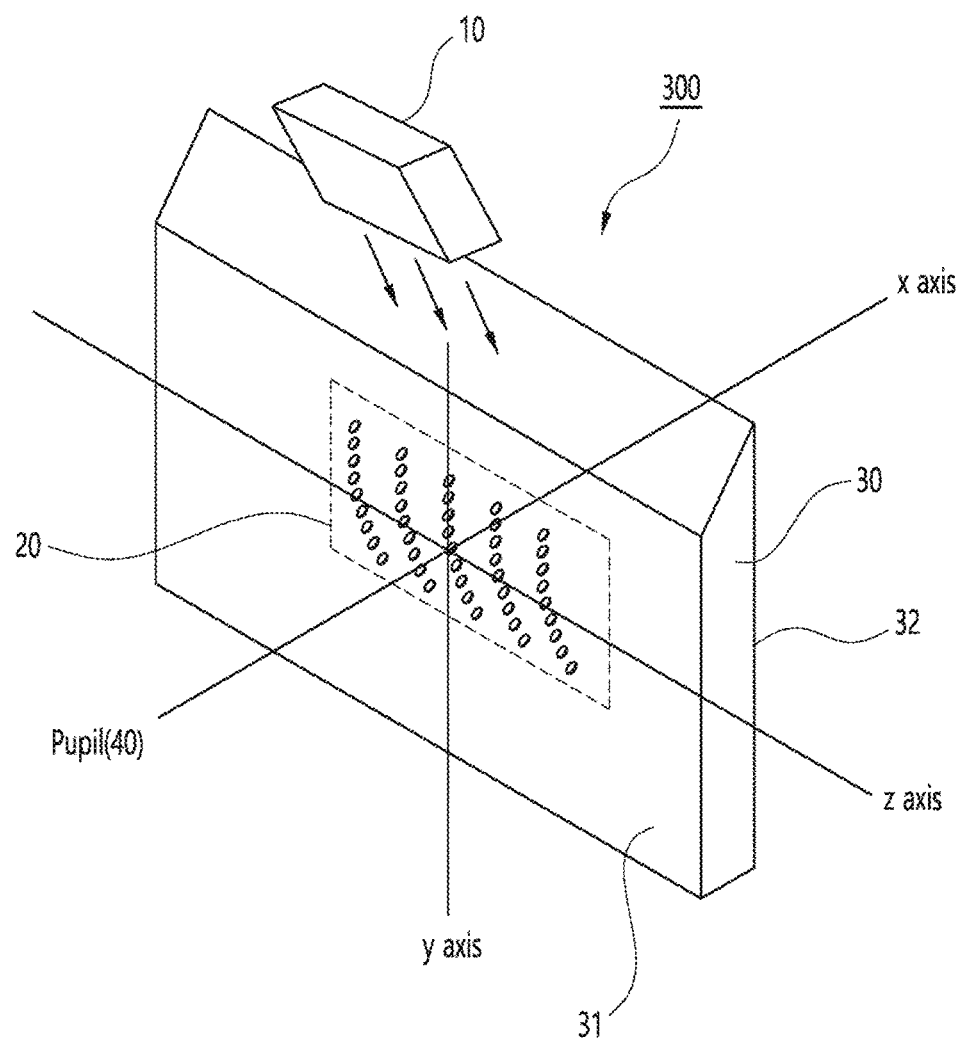
FIG. 12 is a diagram showing the configuration of an optical device for augmented reality according to a modification of the first embodiment of the present invention.

FIG. 12 is a diagram showing the configuration of an optical device 300 for augmented reality according to a modification of the first embodiment of the present invention.

The optical device 300 for augmented reality according to the embodiment shown in FIG. 12 has the same basic configuration as the optical device 200 for augmented reality according to the embodiment described with reference to FIGS. 4 to 11, however, the optical device 300 is characterized in that a plurality of reflective means 20 are formed and each of the reflective means 20 includes a plurality of reflective units 21 to 29.

In this case, a plurality of reflective means 20 are arranged as follows. As described above, when the optical device 300 for augmented reality is placed in front of the pupil 40 of a user, let's assume that a forward direction from the pupil 40 is referred to as an x axis, any one of line segments being parallel to a vertical line between an image output unit 10 and the x axis along the x axis and passing between the first and second surfaces 31 and 32 of an optical means 30 is referred to as an y axis, and a line segment perpendicular to both the x axis and the y axis is referred to as an z axis. Then, each reflective means 20 of the plurality may be arranged at intervals in parallel with each other along the z-axis direction.

In this case, each of the reflective means 20 may be arranged such that each of reflective units 21 to 29 constituting each of the reflective means 20 can be located along a virtual straight line parallel to the z axis along with any one of reflective units 21 to 29 included in adjacent the reflective means 20. Accordingly, when viewed toward a plane perpendicular to the z axis from outside, a plurality of reflective means 20 are seen the same as shown in FIG. 5.

According to the embodiment of FIG. 12, wider field of view and an eye box in the z-axis direction can be provided with the effects as above described with reference to FIGS. 4 to 11.

Figure 13:
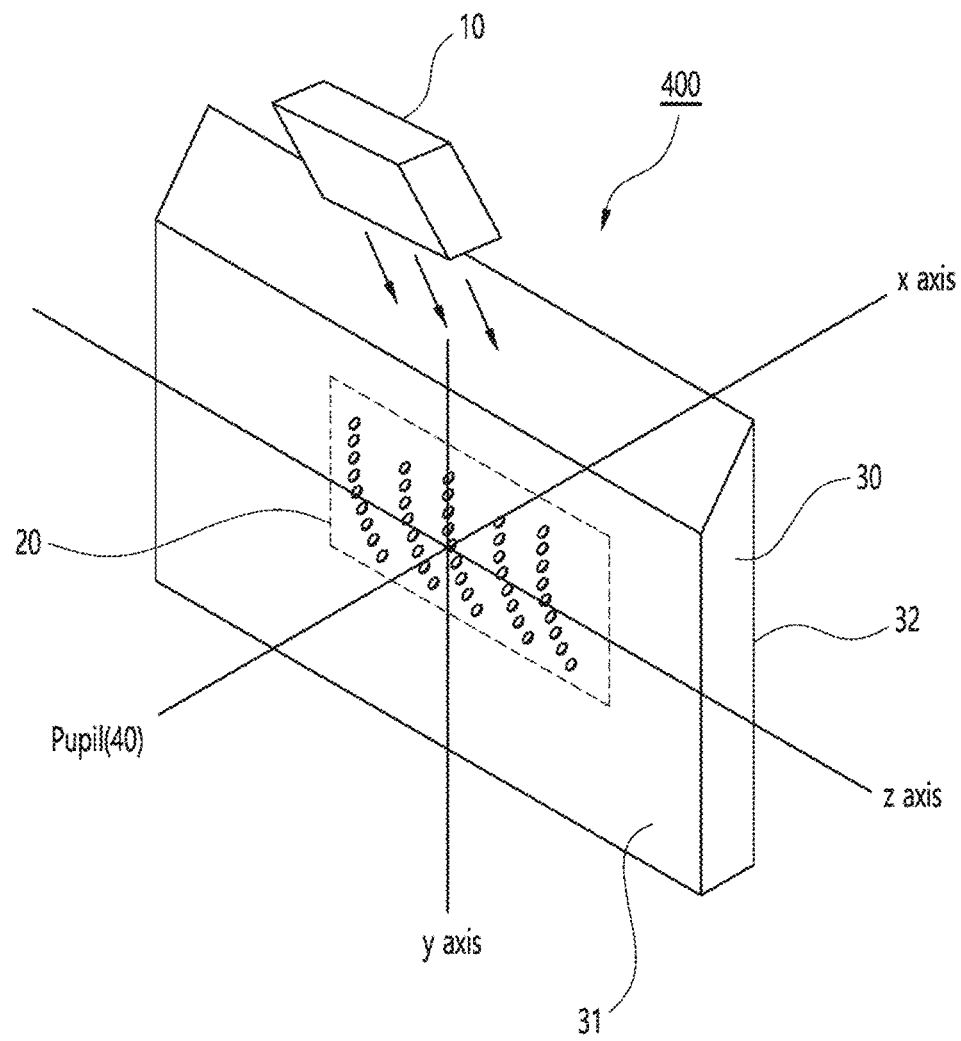
FIG. 13 is a diagram showing the configuration of an optical device for augmented reality according to another modification of the first embodiment of the present invention.

FIG. 13 is a diagram showing the configuration of an optical device 400 for augmented reality according to another modification of the first embodiment of the present invention.

The optical device for augmented reality 400 according to the embodiment shown in FIG. 13 is characterized in that a plurality of reflective means 20 are formed, as in the optical device 300 for augmented reality according to the embodiment illustrated in FIG. 12, and a plurality of the reflective means 20 are arranged such that each of the reflective units 21 to 29 included in each of the reflective means 20 can be prevented from being located along a virtual straight line parallel to the z axis along with any one of reflective units 21 to 29 included in adjacent reflective means 20.

As shown in FIG. 13, when the reflective units 21 to 29 of a first reflective means 20 from the right side of the z axis are compared with the reflective units 21 to 29 of a second reflective means 20 adjacent to the first reflective means 20 sequentially from the upper side (a side near the image output unit 10) of the y-axis direction, it can be seen that the first and second reflective means 20 are arranged such that each of the reflective units 21 to 29 of the first reflective means 20 can be prevented from being located along a virtual straight line parallel to the z axis along with any one of the reflective units 21 to 29 of the second reflective means 20. In other words, it can be seen that when viewed in the z-axis direction, the reflective units 21 to 29 of the first reflective means 20 and the reflective units 21 to 29 of the second reflective means 20 are not aligned with each other along straight lines parallel to the z axis, but are arranged alternately in the y-axis direction.

Figure 14:
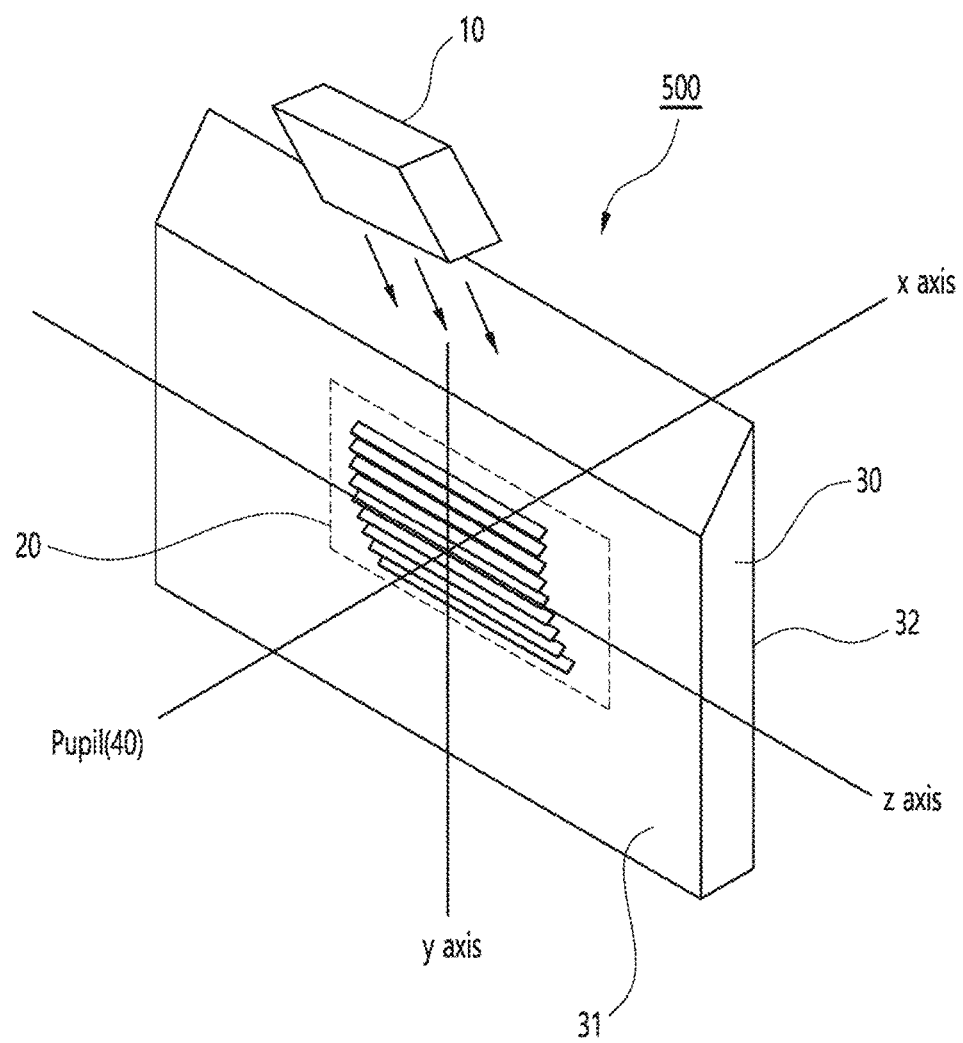
FIG. 14 is a diagram showing the configuration of an optical device for augmented reality according to still another modification of the first embodiment of the present invention.

FIG. 14 is a diagram showing the configuration of an optical device 500 for augmented reality according to still another modification of the first embodiment of the present invention.

The optical device 500 for augmented reality according to the embodiment shown in FIG. 14 is characterized in that it has the same basic configuration as the optical device 200 for augmented reality according to the embodiment described with reference to FIGS. 4 to 11 but each of the reflective units 21 to 29 is formed in bar shapes extending in the z-axis direction.

In other words, as described above, when the optical device 500 for augmented reality is placed in front of the pupil 40 of a user, let's assume that a forward direction from the pupil 40 is referred to as an x axis, any one of line segments being parallel to a vertical line between an image output unit 10 and the x axis along the x axis and passing between the first and second surfaces 31 and 32 of an optical means 30 is referred to as an y axis, and a line segment perpendicular to both the x axis and the y axis is referred to as an z axis. Then, each of the plurality of reflective units 21 to 29 is formed in bar shapes extending in the z-axis direction.

In this case, when viewed toward a plane perpendicular to the z-axis from outside, the size of each of the reflective units 21 to 29 is preferably formed to be 4 mm or less.

Also, even in this embodiment, when the optical means 30 is viewed toward a plane perpendicular to the z axis from outside, the shapes of the reflective units 21 to 29 are seen the same as shown in FIG. 5.

Meanwhile, in the embodiment, at least some of the reflective units 21 to 29 may have a different size(s). Even in this case, the size of each of the reflective units 21 to 29 is preferably formed to be 4 mm or less, as described above.

Furthermore, it is preferable that individual reflective units 21 to 29 are arranged at the same intervals. However, at least some of the reflective units 21 to 29 may be arranged in intervals different from those at which the other reflective units are arranged.

Furthermore, at least some of the reflective units 21 to may be composed of half mirrors that partially reflect light.

Furthermore, at least some of the reflective units 21 to 29 may be composed of refractive elements or diffractive elements other than reflective means.

Furthermore, at least some of the reflective units 21 to 29 may be composed of optical elements such as notch filters that selectively transmit light therethrough according to its wavelength.

Furthermore, at least some of the reflective units 21 to 29 may have a surface coated with a material that absorbs light without reflecting light, wherein the coated surface is opposite surface to a surface reflecting the augmented reality image light.

Moreover, at least some of the reflective units 21 to 29 may have curved surfaces. In this case, the curved surfaces may be concave surfaces or convex surfaces.

Figure 15:
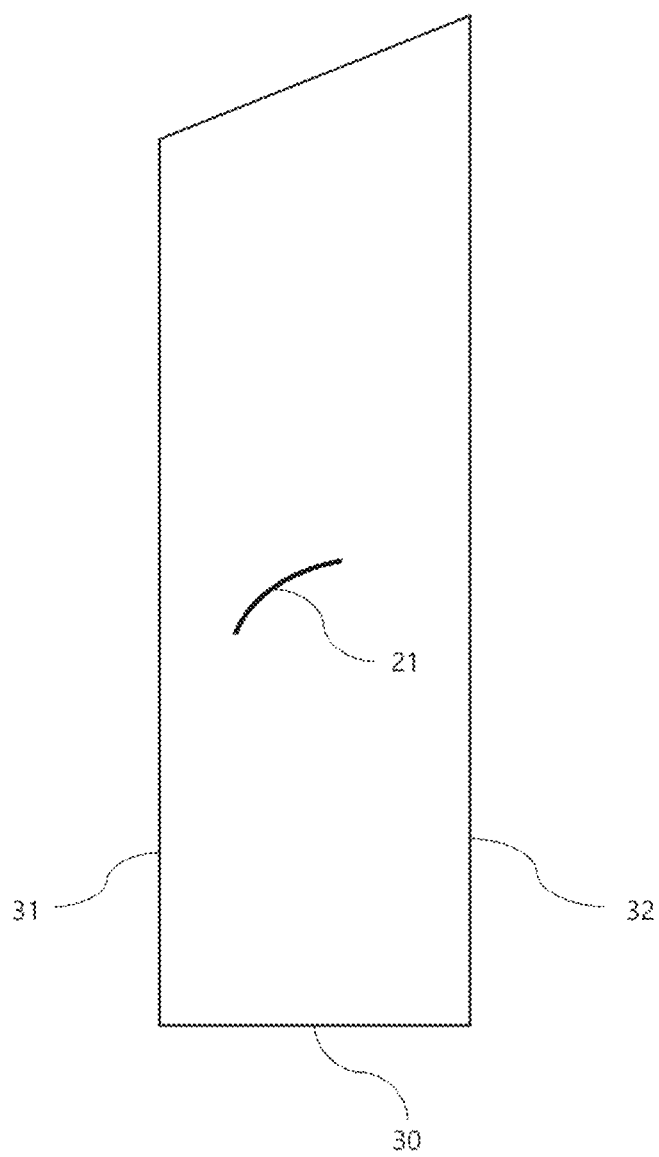
FIG. 15 is a diagram illustrating a state in which the surfaces of reflective units are formed as curved surfaces.

FIG. 15 is a diagram illustrating a state in which the surfaces of reflective units 21 to 29 are formed as curved surfaces, which shows only one reflective unit 21 for ease of description.

As shown in FIG. 15, the surface of the reflective unit 21 is formed as a curved surface, in which the curved surface may be formed as a convex surface that is convex toward the first surface 31 of the optical means 30.

Although the reflective unit 21 having a convex surface convex toward the first surface 31 is shown in FIG. 15, this is an example. Alternatively, the reflective unit 21 may be formed to have a concave surface concave toward the first surface 31.

Figure 16:
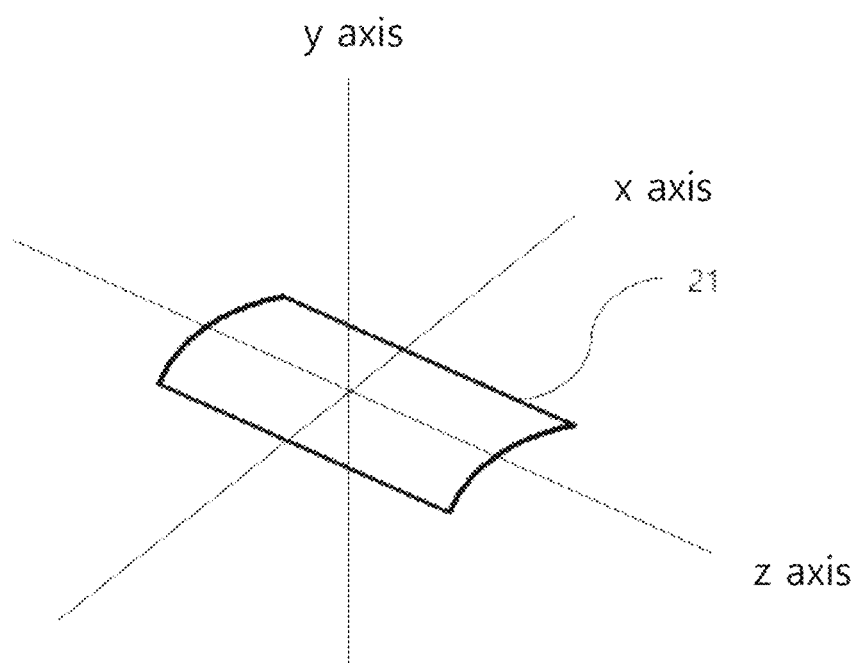
FIG. 16 is a diagram showing another example of the curved surface shape of the reflecting units.

FIG. 16 is a diagram showing another example of the shape of curved surface of the reflecting units 21 to 29, which shows only one reflecting unit 21 for ease of description.

The reflective unit 21 shown in FIG. 16 has a curved surface and when the reflective unit 21 is placed in front of the pupil 40 of a user, assuming that a forward direction from the pupil 40 is referred to as an x axis, any one of line segments being parallel to a vertical line between an image output unit 10 and the x axis along the x axis and passing between the first and second surfaces 31 and 32 of an optical means 30 is referred to as an y axis, and a line segment perpendicular to both the x axis and the y axis is referred to as an z axis, then the length of the reflective unit 21 in the z-axis direction is longer than that of the reflective unit 21 in the x-axis direction.

In other words, the reflective unit 21 shown in FIG. 16 is characterized in that it extends in a bar shape along the z-axis direction inside the optical means 30 and is formed in a shape obtained by cutting an cylindrical reflective unit in the longitudinal direction thereof.

In FIG. 16, the reflective unit 21 has a length in the z-axis direction longer than that in the x-axis direction and is formed as a convex surface that is convex toward the first surface 31 of the optical means 30.

In FIG. 16, although the reflective unit 21 has a bar shape extending along with the z-axis direction, the reflective unit 21 may have a bar shape extending along with the y-axis direction, i.e., a bar shape in which the length thereof in the y-axis direction is longer than that in the z-axis direction.

Furthermore, since the reflective unit 21 shown in FIG. 16 is formed in a shape obtained by cutting an overall cylindrical shape in the longitudinal direction thereof, it has a rectangular shape when the reflecting part 21 is viewed in the y-axis direction, but this is an example. The reflective unit 21 may be formed to have another shape, such as a circular, triangular, or rectangular shape, as a whole when viewed in the y-axis direction. In addition, the reflective unit 21 may be formed in an elliptical shape having a long axis in the x-axis direction when viewed in the y-axis direction.

Furthermore, although the reflective unit 21 having a convex surface that is convex toward the first surface 31 of the optical means 30 is shown in FIG. 16, this is an example. It is obvious that the reflective unit 21 may be formed to have a concave surface that is concave toward the first surface 31.

Furthermore, the reflective unit 20 described in the embodiment of FIG. 14 may be formed in a shape as shown in FIG. 16. In this case, the reflective unit 20 of FIG. 14 extends entirely along the z-axis direction inside the optical means 30 and is formed in a single bar. In contrast, the reflective unit 21 of FIG. 16 may be viewed as being formed by dividing the bar shape of FIG. 14.

Second Embodiment

Next, optical devices 600 to 1300 for augmented reality according to a second embodiment of the present invention will be described with reference to FIGS. 17 to 34.

Figure 17:
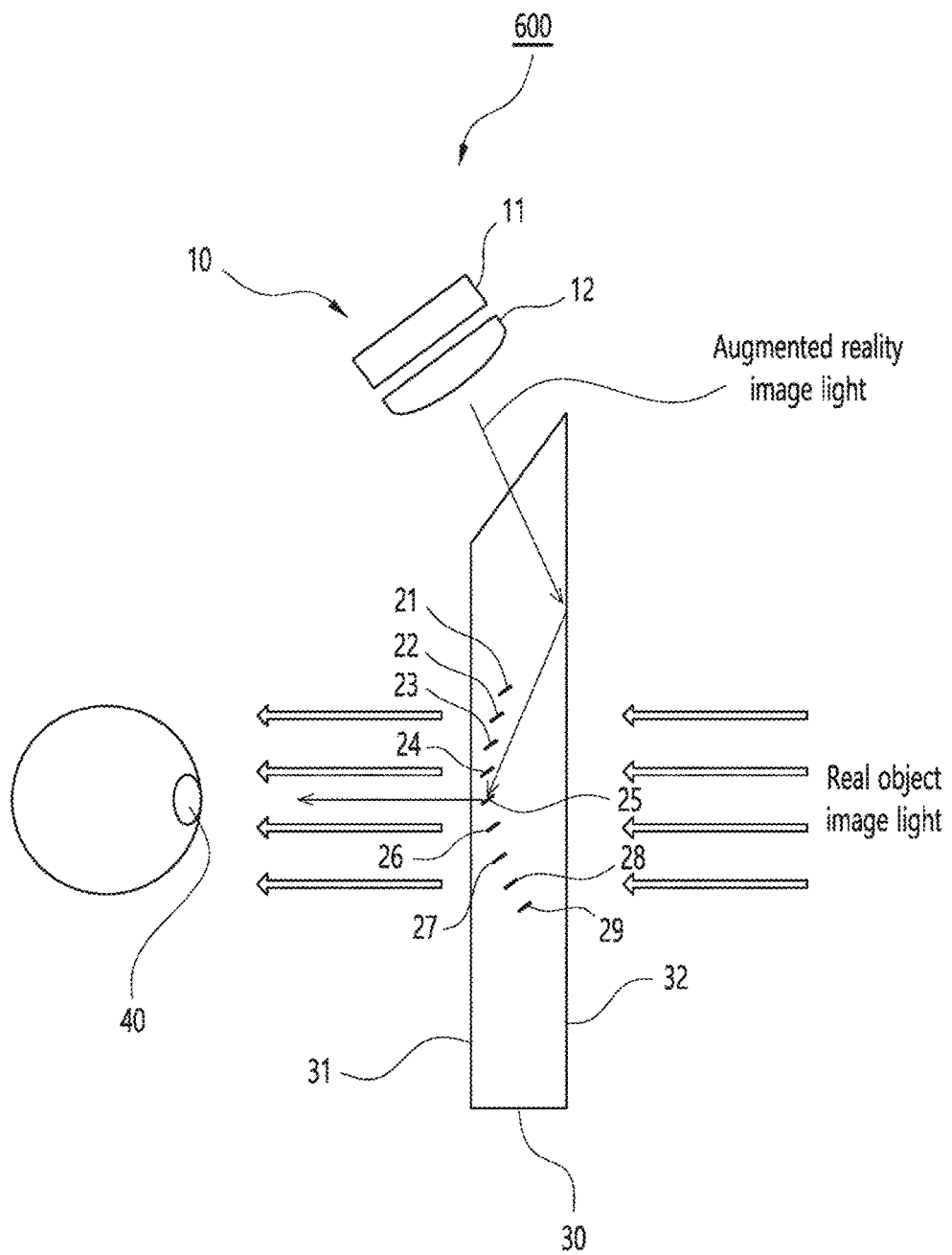
FIG. 17 is a diagram showing an optical device for augmented reality according to a second embodiment of the present invention.

FIG. 17 is a diagram showing an optical device 600 for augmented reality according to a second embodiment of the present invention.

The optical device 600 for augmented reality according to the second embodiment shown in FIG. 17 has the same basic configuration as the first embodiment shown in FIG. 4, and is different from the first embodiment only in the arrangement structure of reflective units 21 to 29 constituting a reflective means 20.

The reflective means 20 of the optical device 600 for augmented reality according to the second embodiment shown in FIG. 17 includes a first reflective unit group 20A comprising a plurality of reflective units 21 to 24 and a second reflective unit group 20B comprising a plurality of reflective units 25 to 29, and the reflective means 20 is embedded and disposed inside the optical means 30 so that the distance between the second reflective unit group 20B and an image output unit 10 is larger than the distance between the first reflective unit group 20A and the image output unit 10.

In this case, the reflective units 21 to 24 included in the first reflective unit group 20A are embedded and disposed inside the optical means 30 so that the reflective units 21 to 24 are arranged closer to the first surface 31 of the optical means 30 as the distance from the image output unit 10 increases, and the reflective units 25 to 29 included in the second reflective unit group 20B are embedded and disposed inside the optical means 30 so that the reflective units 25 to 29 are arranged farther from the first surface 31 of the optical means 30 as the distance from the image output unit 10 increases.

There may be a case where at least any one of the first and second surfaces 31 and second surface 32 of the optical means 30 is formed as a curved surface, or is not parallel to a plane perpendicular to a straight line in a forward direction from the center of the pupil 40 and is formed to have an inclination angle. Accordingly, being arranged closer to the first surface 31 of the optical means 30 as the distance from the image output unit 10 increases means being arranged closer to a perpendicular plane present between the first surface 31 and the pupil 40 and perpendicular to a straight line in a forward direction from the pupil 40 as the distance from the image output unit 10 increases.

In the same manner, being arranged farther from the first surface 31 of the optical means 30 as the distance from the image output unit 10 increases means being arranged farther from a perpendicular plane present between the first surface 31 and the pupil 40 and perpendicular to a straight line in a forward direction from the pupil 40 as the distance from the image output unit 10 increases.

Since other configurations are the same as those of the first embodiment described above, detailed descriptions thereof will be omitted.

Figure 18:
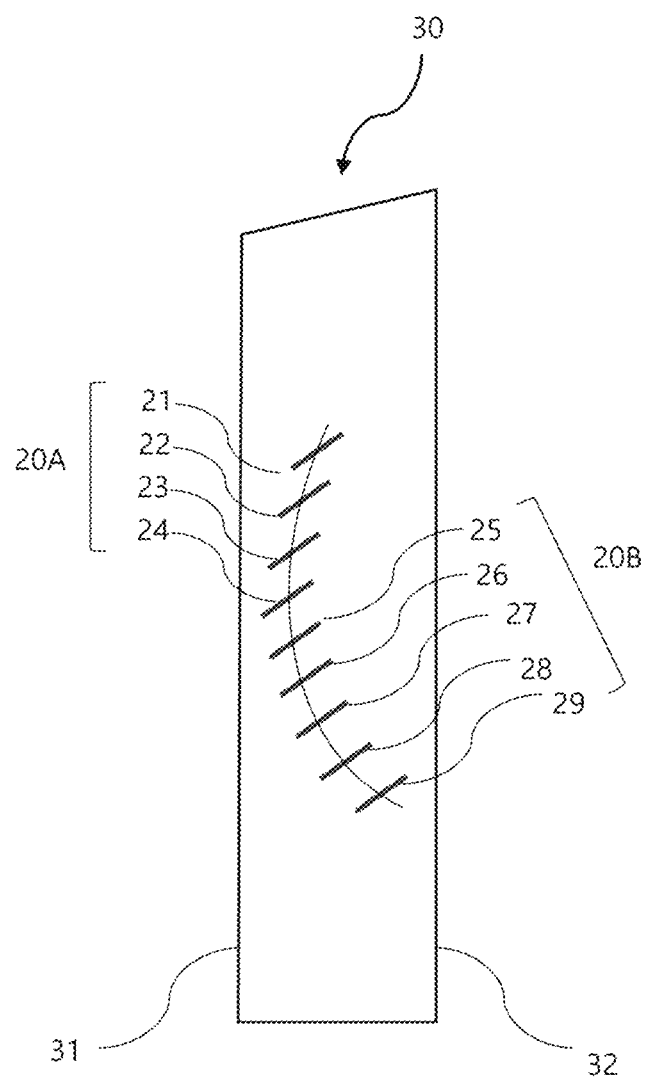
FIG. 18 is a diagram illustrating the arrangement structure of the reflective units illustrated in FIG. 17.

FIG. 18 is a diagram illustrating the arrangement structure of the reflective units 21 to 29 illustrated in FIG. 17.

Referring to FIG. 18, as described above, the reflective means 20 includes the first reflective unit group 20A and the second reflective unit group 20B. The first reflective unit group 20A comprises a plurality of reflective units 21 to 24, and the second reflective unit group 20B includes a plurality of reflective units 25 to 29.

It can be seen that the plurality of reflective units 21 to 24 constituting the first reflective unit group 20A and the plurality of reflective units 25 to 29 constituting the second reflective unit group 20B are embedded and arranged in an internal space between the first and second surfaces 31 and 32 of the optical means 30 and the reflective units 21 to 29 are arranged such that a smooth "C"-shaped curve can be formed when the centers of the reflective units 21 to 29 are connected with a virtual line.

Although the reflective units 21 to 24 constituting the first reflective unit group 20A are shown as successive reflective units in FIGS. 17 and 18, this is an example. For example, three reflective units 21, 25 and 27 that are not adjacent to each other may constitute the first reflective unit group 20A. This is also true in the case of the second reflective unit group 20B.

Furthermore, it is obvious that a plurality of the first reflective unit group 20A and a plurality of the second reflective unit group 20B may be formed.

Furthermore, not all of the plurality of reflective units 21 to 29 constituting the reflective means 20 must be included in any one of the first and second reflective unit groups 20A and 20B. It is obvious that only some of the plurality of reflective units 21 to 29 constituting the reflective means 20 may constitute the first and second reflective unit groups 20A and 20B.

Figure 19:
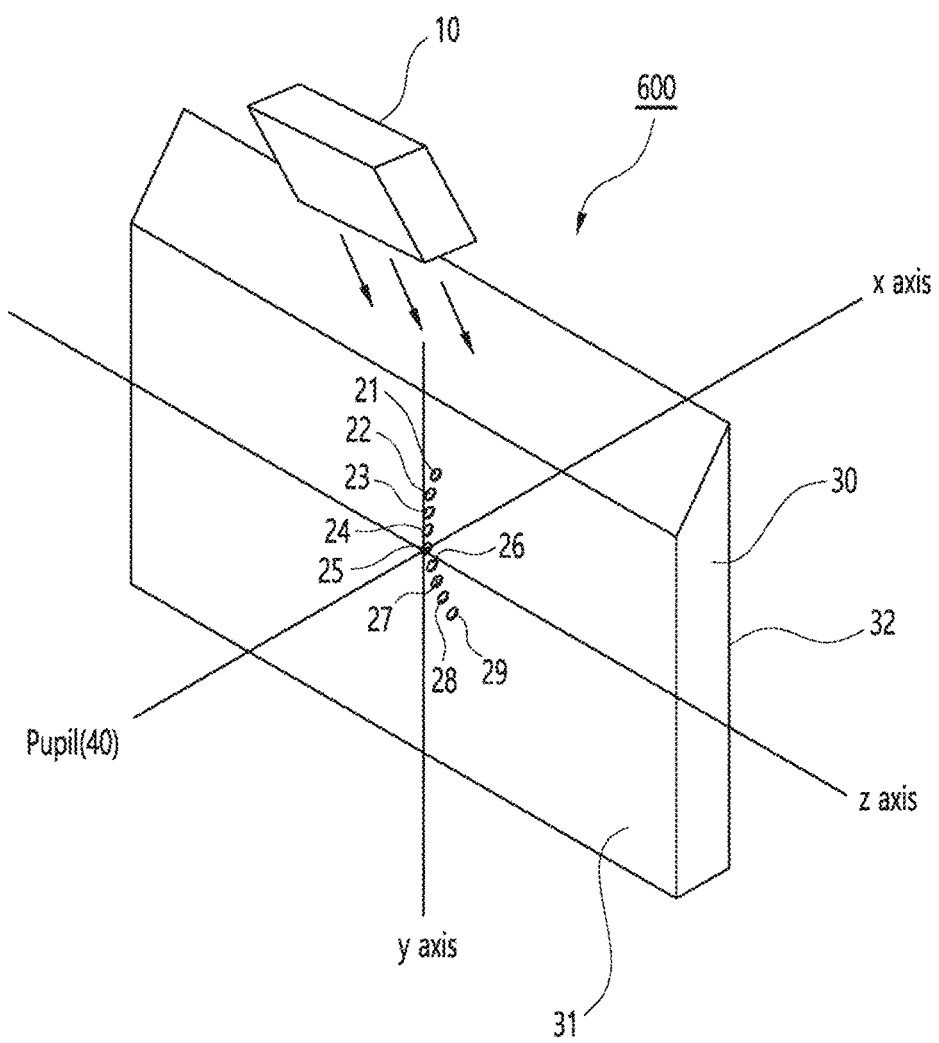
FIG. 19 is a perspective view of the optical device for augmented reality according to the second embodiment of the present invention.

FIG. 19 is a perspective view of the optical device 600 for augmented reality illustrated in FIGS. 17 and 18.

Referring to FIG. 19, when the optical device 600 for augmented reality is placed in front of the pupil 40 of a user, let's assume that a forward direction from the pupil 40 is referred to as an x axis, any one of line segments being parallel to a vertical line from the image output unit 10 to the x axis along the x axis and passing between the first and second surfaces 31 and 32 of the optical means 30 is referred to as an y axis, and a line segment perpendicular to both the x axis and the y axis is referred to as an z axis. Then, the z axis becomes a line segment that passes between the first and second surfaces 31 and 32 of the optical means 30 and the reflective units 21 to 29 are seen the same as shown in FIGS. 17 and 18 when the optical means 30 or optical device 600 for augmented reality is viewed toward a plane perpendicular to the z axis from outside.

In other words, when the optical means 30 or optical device 600 for augmented reality is viewed toward a plane perpendicular to the z axis, a plurality of reflective units 21 to 24 constituting the first reflective unit group 20A are embedded and disposed inside the optical means 30 so that a plurality of reflective units 21 to 24 are arranged closer to the first surface 31 of the optical means as the distance from the image output unit 10 increases. Also, a plurality of reflective units 25 to 29 constituting the second reflective unit group 20B are embedded and disposed inside the optical means 30 so that a plurality of reflective units 25 to 29 are arranged farther from the first surface 31 of the optical means as the distance from the image output unit 10 increases.

Furthermore, the first and second reflective unit groups 20A and 20B are arranged such that the distance between the second reflective unit group 20B and the image output unit 10 is longer than the distance between the first reflective unit group 20A and the image output unit 10. This means that when the optical means 30 is viewed toward a plane perpendicular to the z axis in FIG. 19, the first reflective unit group 20A is arranged above the second reflective unit group 20B.

FIG. 20 is a diagram illustrating the effect of the arrangement structure of the reflective units 21 to 29 of the optical device 600 for augmented reality shown in FIGS. 17 to 19.

FIG. 20(a) shows a case where the reflective units 21 to 29 have an arrangement structure such as that described in FIGS. 17 to 19, and FIG. 20(b) shows a case where all the reflective unit 21 to 29 are arranged in a straight line, i.e., a case where all the reflective units 21 to 29 are arranged to have the same distance to the first surface 31 regardless of the distance from an image output part 10.

Referring to FIG. 20(b), it can be seen that all the reflective units 21 to 29 are arranged to have the same distance to the second surface 32 of the optical means 30 regardless of the distance from the image output unit 10, and thus the augmented reality image light totally reflected from the second surface 32 of the optical means 30 does not appropriately reach the lower reflective units 28 and 29.

In contrast, referring to FIG. 20(a), it can be seen that the reflective units 24 and 29 are arranged as described with reference to FIG. 17 to FIG. 19, and the augmented reality image light totally reflected from the second surface 32 of the optical means 30 is transferred to all the reflective units 21 to 29.

Meanwhile, the reflective units 21 to 29 of the second embodiment described with reference to FIGS. 17 to 19 may be arranged to have an inclination angle of 45 degrees or less with respect to a straight line in a forward direction from the center of the pupil 40 of a user, as in the first embodiment. Since this is the same as previously described with reference to FIGS. 8 and 9, a detailed description thereof will be omitted.

Meanwhile, as described above, the augmented reality image light output from the image output unit 10 may be directly transferred to the reflective units 21 to 29 without being totally reflected inside the optical unit 30, or may be totally reflected from the inner surface of the optical unit 30 at least once and then transferred to the reflective units 21 to 29.

Figure 21:
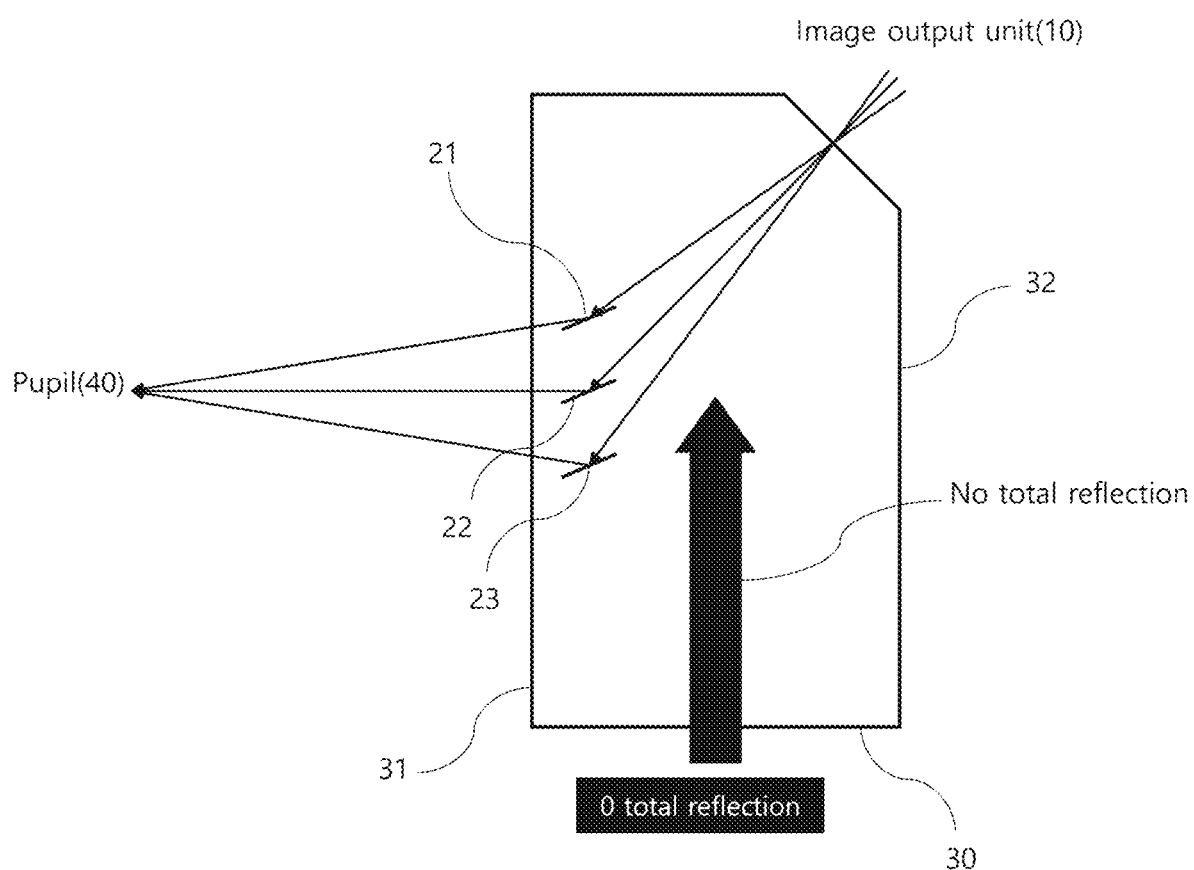
FIGS. 21 to 23 are diagrams illustrating the numbers of times that augmented reality image light is totally reflected by an optical means.
Figure 22:
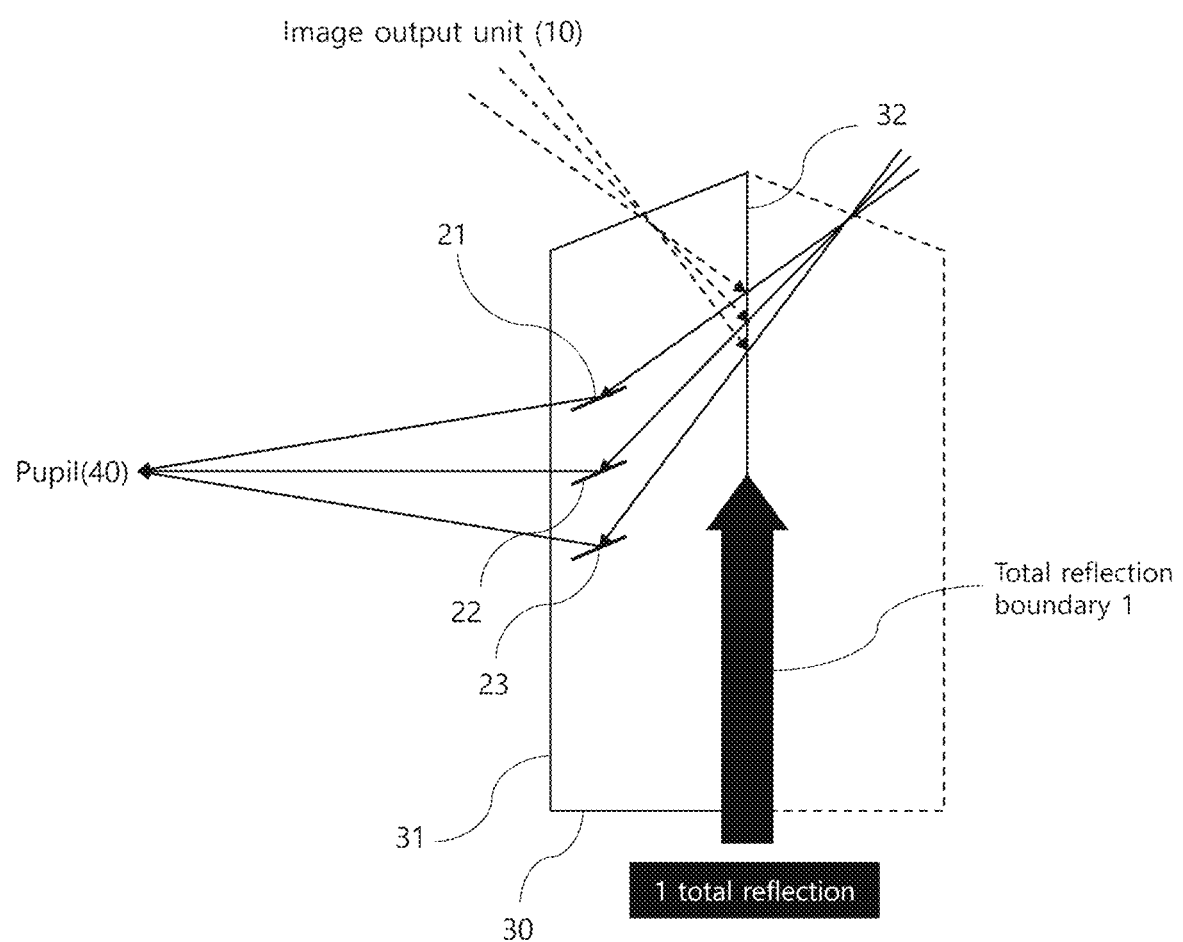
Figure 23:
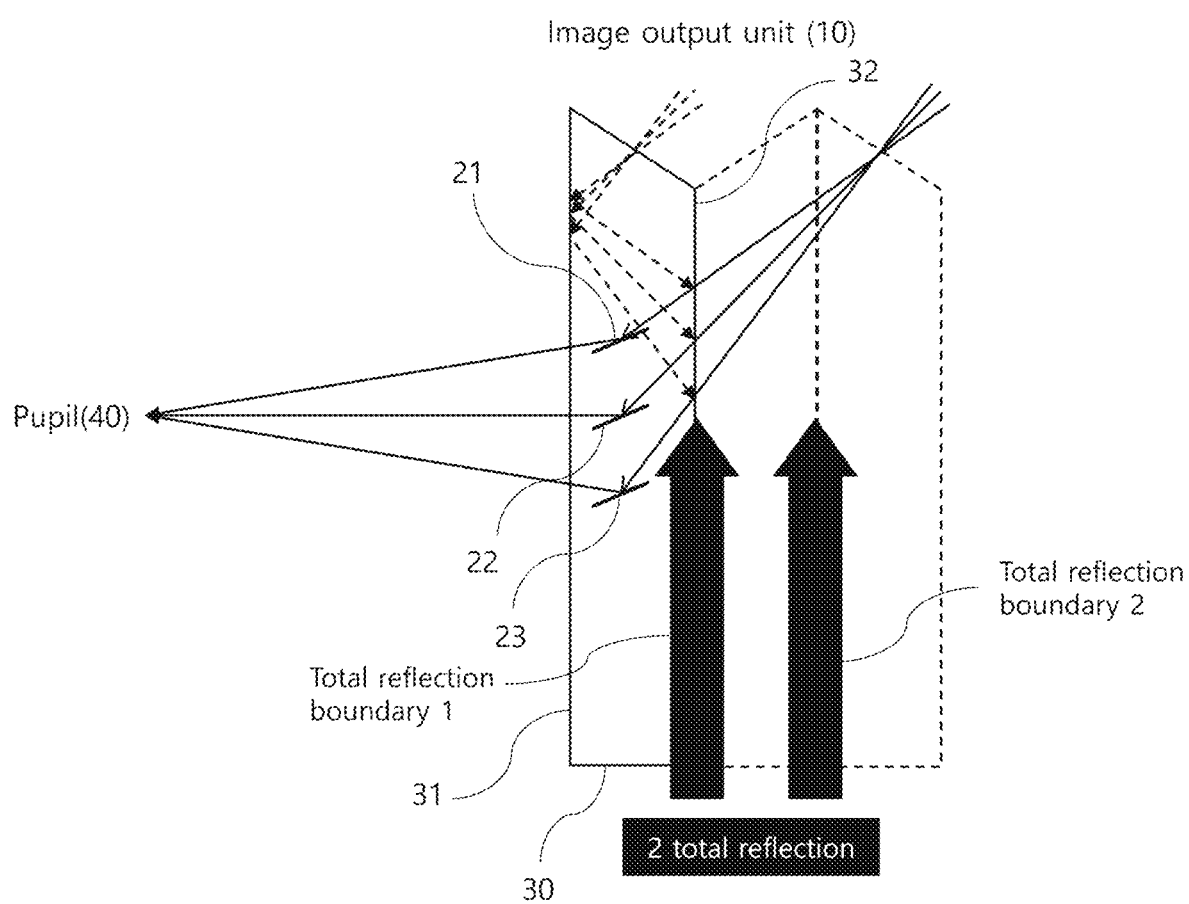

FIGS. 21 to 23 are diagrams illustrating the numbers of times that augmented reality image light is totally reflected by an optical means 30, which show only three reflective units 21 to 23 for ease of description.

FIG. 21 shows a case where augmented reality image light is not totally reflected inside the optical means 30.

As shown in FIG. 21, the augmented reality image light output from the image output unit 10 is directly transferred to the reflective units 21 to 23 without being totally reflected inside the optical means 30, is reflected from the reflective units 21 to 23, and is then transferred to the pupil 40.

FIG. 22 shows a case where augmented reality image light is totally reflected inside the optical means 30 once.

As shown in FIG. 22, the augmented reality image light output from the image output unit 10 is totally reflected from the second surface 32 of the optical means 30 once, transferred to the reflective units 21 to 23, and then reflected from the reflective units 21 to 23, thereby being transferred to the pupil 40. FIG. 22 corresponds to a case in which an optical means 30 such as that shown in FIG. 21 is bisected with respect to the x-axis direction and a bisector is used as the second surface 32 of the optical means 30.

FIG. 23 shows a case where augmented reality image light is totally reflected inside the optical means 30 twice.

Referring to FIG. 23, the augmented reality image light output from the image output unit 10 is totally reflected from the first surface 31 of the optical means 30, totally reflected from the second surface 32 again, transferred to the reflective units 21 to 23, and then reflected from the reflective units 21 to 23 again, thereby being transferred to the pupil 40. FIG. 23 corresponds to a case in which the optical means 30 such as that shown in FIG. 21 is trisected with respect to the x-axis direction and a trisector closer to the pupil 40 is used as the second surface 32 of the optical means 30.

Although the reflective units 21 to 23 are shown in a form arranged in a straight line when the optical means 30 is viewed toward a plane perpendicular to the z-axis in FIGS. 21 to 23, this is simply shown for ease of description. The same is applied to a case where the reflective units 21 to 23 have an arrangement structure such as that described with reference to FIGS. 17 to 19.

Figure 24:
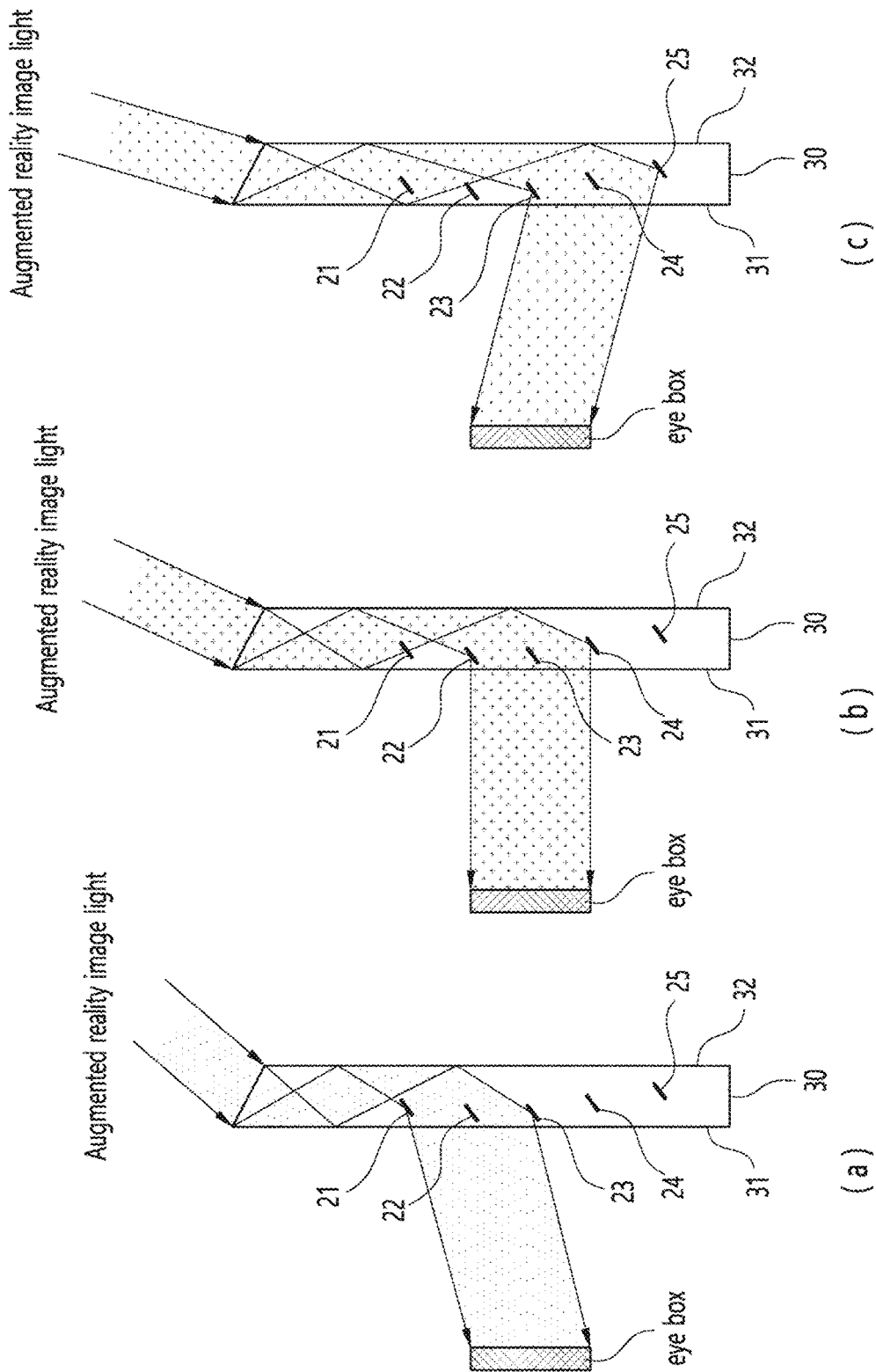
FIGS. 24 and 25 are diagrams illustrating the overall operation of the optical device for augmented reality.
Figure 25:
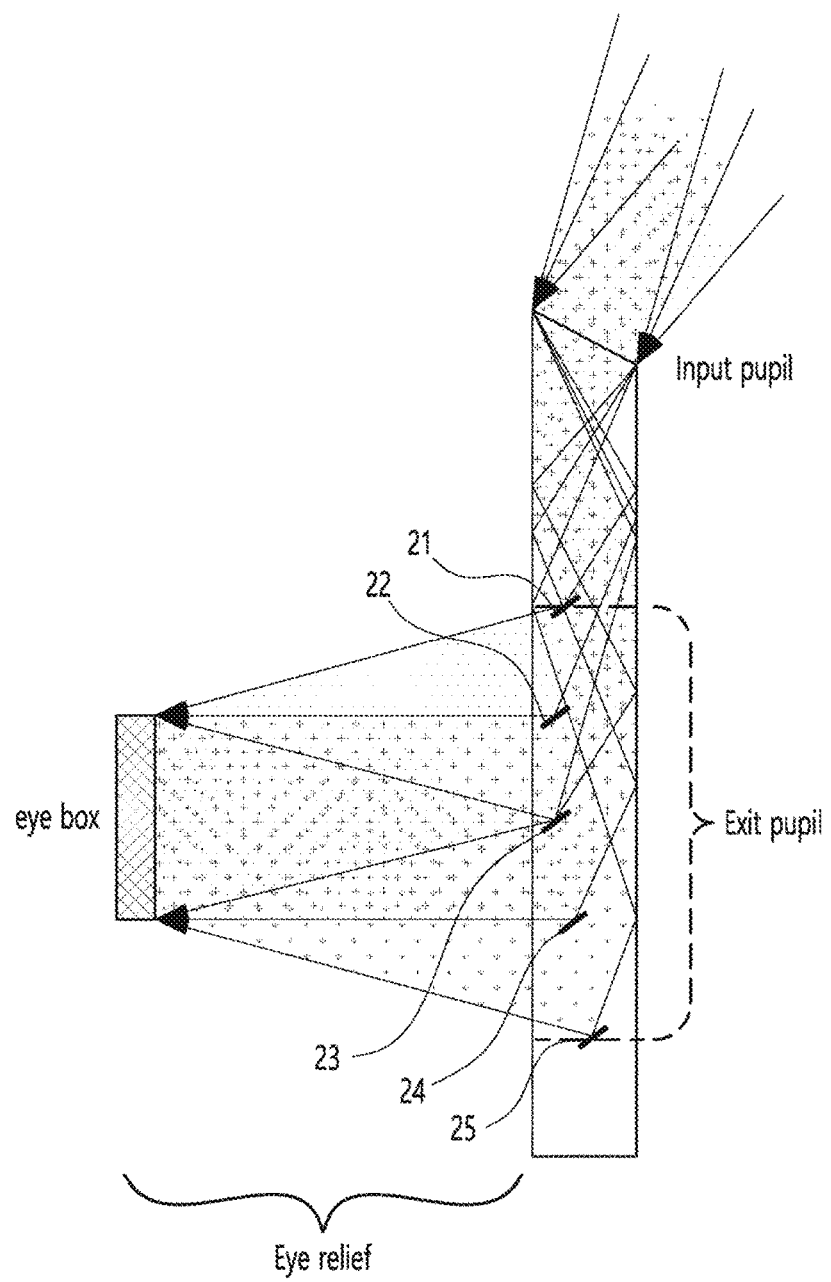

FIGS. 24 and 25 are diagrams illustrating the overall operation of the optical device 600 for augmented reality.

FIGS. 24 and 25 show a case where total reflection occurs twice inside the optical means 30 as an example, in which case only five reflective units 21 to 25 are shown for ease of description.

Referring to FIGS. 24(*a*), 24(*b*), and 24(*c*), it can be seen that rays of augmented reality image light entering at different angles are totally reflected from the first and second surfaces 31 and 32 of the optical means 30 and are then transferred to an eye box by the reflective units 21 to 25 having the same inclination angle and arrangement structure as described above.

The reflective units 21 to 23 are used in FIG. 24(*a*), the reflective units 22 to 24 are used in FIG. 24(*b*), and the reflective units 23 to 25 are used in FIG. 24(*c*). These reflective units transfer augmented reality image light to an eye box at an angle corresponding to the incident angle of the light path of the augmented reality image light, i.e., the exit angle of the light path of the augmented reality image light output from the image output unit 10. In this case, the eye box is the maximum space in which the pupil 40 of the user can be located in viewing augmented reality image light as it is output from the image output unit 10. The first and second surfaces 31 and 32 of the optical means 30 act as input surfaces, and the augmented reality image light totally reflected from these input surfaces is all output in the direction of the eye box through the reflective units 21 to 25.

Meanwhile, FIG. 25 shows the rays of augmented reality image light shown in FIGS. 24(*a*), 13(*b*), and 13(*c*) together. Referring to this drawing, it can be seen that the augmented reality image light output from the image output unit 10 enters through the upper portion of the optical means 30 acting as an input pupil, is totally reflected through the first and second surface 31 and 32 of the optical means 30 twice, is reflected through the reflective units 21 to 25, and is then transferred to the eye box through the first surface 31 of the optical means 30 acting as an exit pupil. In this case, the distance between the eye box where the pupil 40 can be located and the optical means 30 is an eye relief.

As shown in FIGS. 24 and 25, the augmented reality image light output from the image output unit 10 and totally reflected from the first and second surface 31 and 32 of the optical means 30 is all transferred toward the eye box by the inclination angle and arrangement structures of the reflective units 20 such as those described above, and thus the light efficiency of augmented reality image light may be considerably improved.

Figure 26:
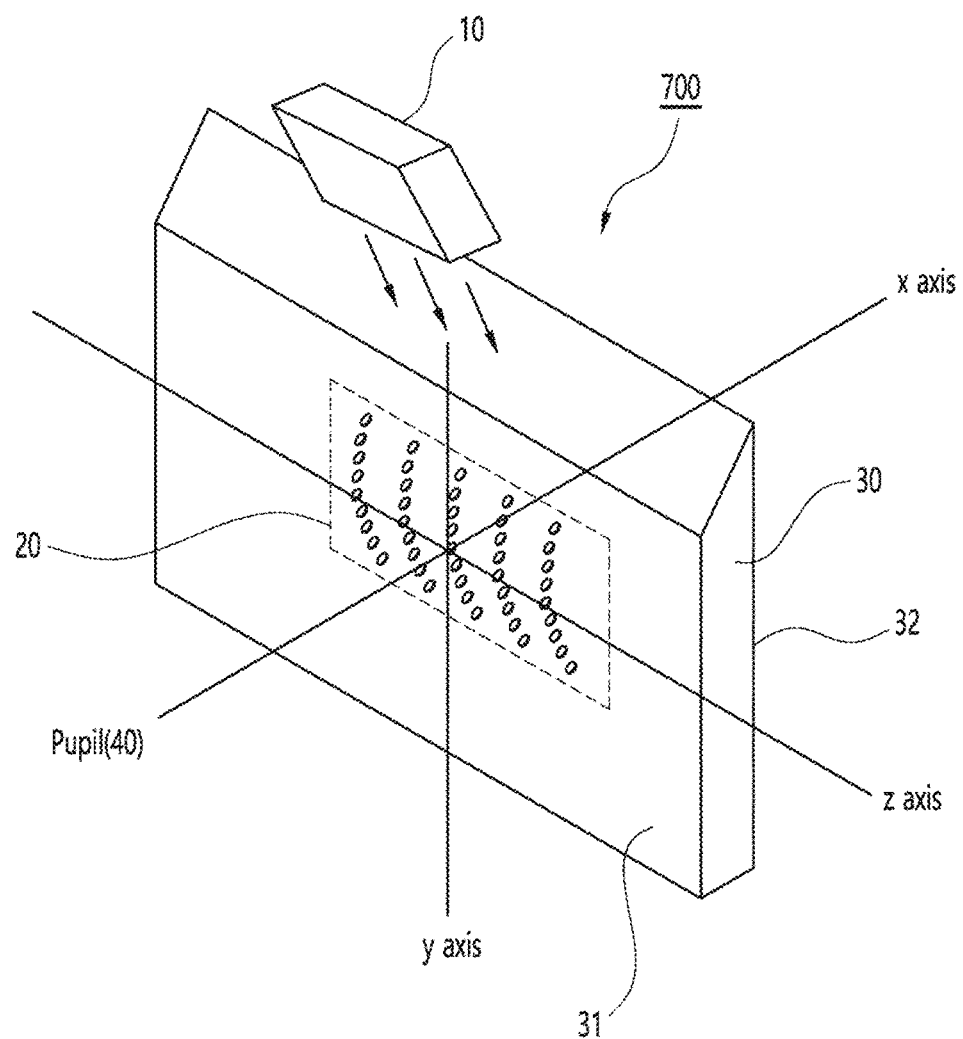
FIG. 26 is a diagram showing the configuration of an optical device for augmented reality according to a modification of the second embodiment of the present invention.

FIG. 26 is a diagram showing the configuration of an optical device 700 for augmented reality according to a modification of the second embodiment of the present invention.

The optical device 700 for augmented reality according to the embodiment shown in FIG. 26 is characterized in that it has the same basic configuration as the optical device 600 for augmented reality according to the second embodiment described with reference to FIG. 17 but a plurality of reflective means 20 are formed, wherein each of the plurality of reflective means 20 includes a first reflective unit group 20A comprising a plurality of reflective units 21 to 24 and a second reflective unit group 20B comprising a plurality of reflective units 25 to 29.

The plurality of reflective means 20 are arranged as follows. When the optical device 700 for augmented reality or an optical means 30 is placed in front of the pupil 40 of a user, let's assume that a forward direction from the pupil 40 is referred to as an x axis, any one of line segments being parallel to a vertical line from an image output unit 10 to the x axis along the x axis and passing between the first and second surfaces 31 and 32 of the optical means 30 is referred to as an y axis, and a line segment perpendicular to both the x axis and the y axis is referred to as an z axis. Then, a plurality of reflective means 20 may be arranged at intervals in parallel with each other along the z-axis direction.

In this case, the reflective means 20 may be arranged such that each of reflective units 21 to 29 constituting each of the reflective means 20 can be located along a virtual straight line parallel to the z axis along with any one of reflective units 21 to 29 included in adjacent one of the reflective means 20. Accordingly, when the optical means 30 is viewed toward a plane perpendicular to the z axis from outside, the plurality of reflective means 20 is seen the same as shown in FIGS. 17 and 18.

According to the embodiment of FIG. 26, there is provided the advantage of wider angle of field of view and an eye box in the z-axis direction while having the effects described with reference to FIGS. 17 to 19.

Figure 27:
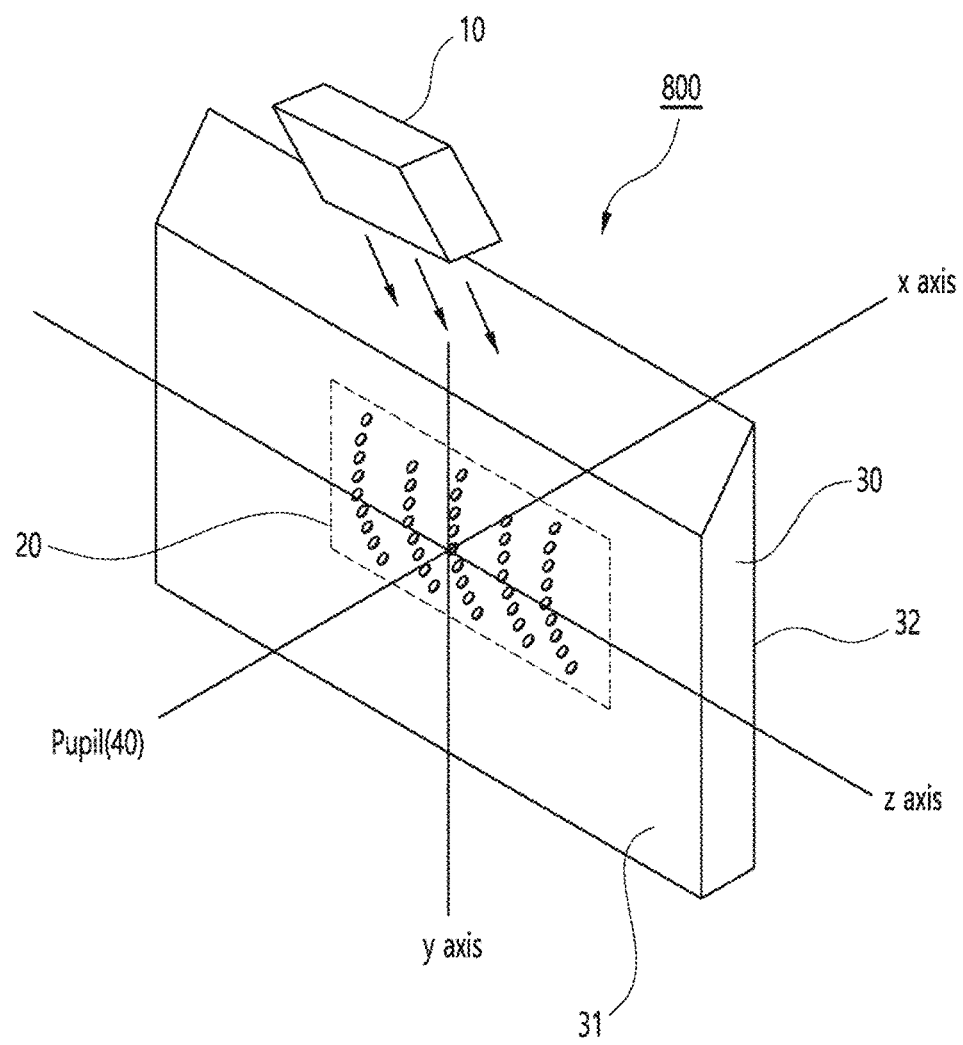
FIG. 27 is a diagram showing the configuration of an optical device for augmented reality according to another modification of the second embodiment of the present invention.

FIG. 27 is a diagram showing the configuration of an optical device 800 for augmented reality according to another modification of the second embodiment of the present invention.

The optical device for augmented reality 800 according to the embodiment shown in FIG. 27 is characterized in that a plurality of reflective means 20 are formed, as in the optical device 700 for augmented reality according to the embodiment illustrated in FIG. 26, and the reflective means 20 are arranged such that each of reflective units 21 to 29 constituting each of the reflective means 20 can be prevented from being located along a virtual straight line parallel to the z axis along with any one of reflective units 21 to 29 included in adjacent the reflective means 20.

In other words, as shown in FIG. 27, when the reflective units 21 to 29 of a first reflective means 20 from the right side of the z axis are compared with the reflective units 21 to 29 of a second reflective means 20 adjacent to the first reflective means 20 sequentially from the upper side (a side near the image output unit 10) of the y-axis direction, it can be seen that the first and second reflective means 20 are arranged such that each of the reflective units 21 to 29 of the first reflective means 20 can be prevented from being located along a virtual straight line parallel to the z axis along with any one of the reflective units 21 to 29 of the second reflective means 20.

In other words, when viewed in the z-axis direction, the reflective units 21 to 29 of the first reflective means 20 and the reflective units 21 to 29 of the second reflective means are not aligned with each other along straight lines parallel to the z axis, but are arranged alternately in the y-axis direction.

Figure 28:
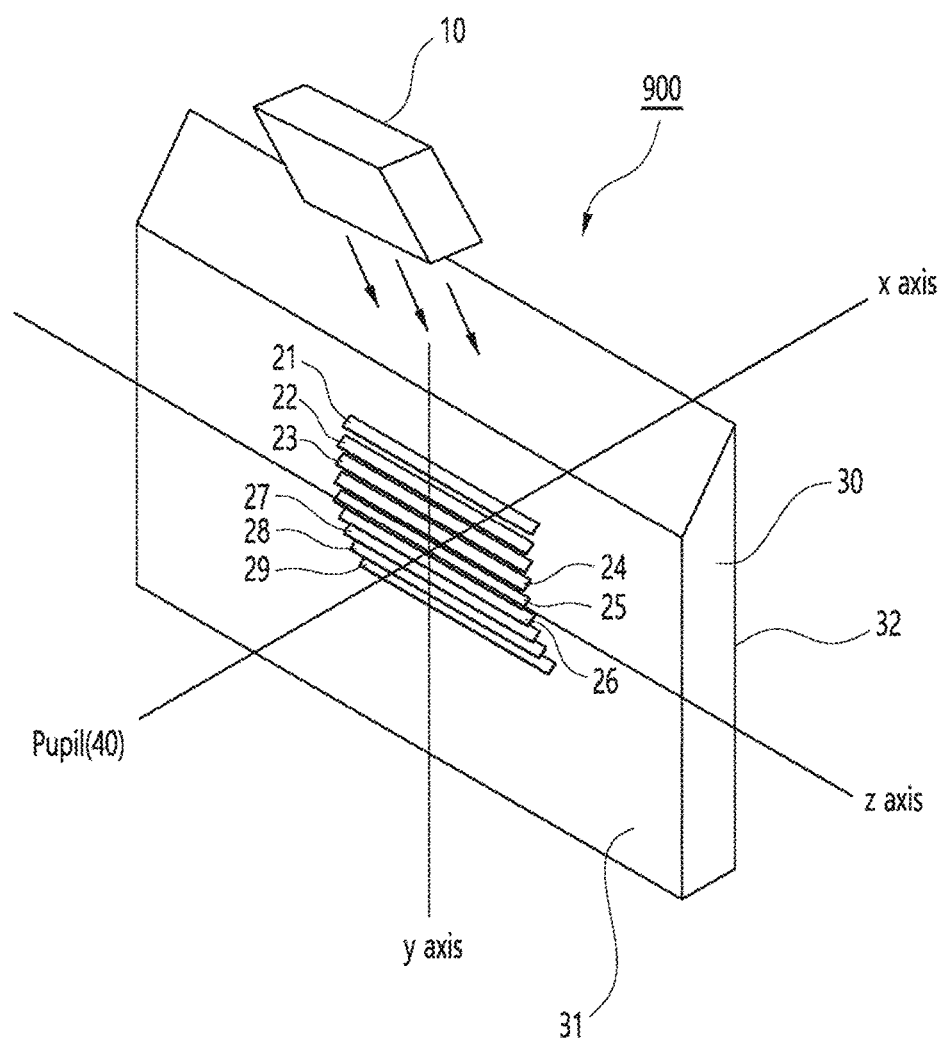
FIG. 28 is a diagram showing the configuration of an optical device for augmented reality according to still another modification of the second embodiment of the present invention.

FIG. 28 is a diagram showing the configuration of an optical device 900 for augmented reality according to still another modification of the second embodiment of the present invention.

The optical device 900 for augmented reality according to the embodiment shown in FIG. 14 is characterized in that it has the same basic configuration as the optical device 600 for augmented reality according to the embodiment described with reference to FIGS. 17 and 18 but each of the plurality of reflective units 21 to 29 is formed in bar shapes.

In this case, the reflective units 21 to 29 have the following arrangement structure. When the optical device 900 for augmented reality or an optical means 30 is placed in front of the pupil 40 of a user, let's assume that a forward direction from the pupil 40 is referred to as an x axis, any one of line segments being parallel to a vertical line from an image output unit 10 to the x axis along the x axis and passing between the first and second surfaces 31 and 32 of the optical means 30 is referred to as an y axis, and a line segment perpendicular to both the x axis and the y axis is referred to as an z axis. Then, each of the plurality of reflective units 21 to 29 is formed in bar shapes extending along virtual straight lines parallel to the z axis.

Even in this embodiment, when the optical means 30 is viewed toward a plane perpendicular to the z axis, the shapes of the reflective units 21 to 29 are seen the same as shown in FIGS. 17 and 18.

In the case of the present embodiment, when viewed toward a plane perpendicular to the z-axis from outside, the size of each of the reflective units 21 to 29 is preferably formed to be 4 mm or less.

Meanwhile, in the second embodiment and the modifications of the second embodiment, at least some of the reflective units 21 to 29 may have a different size(s). Even in this case, the size of each of the reflective units 21 to 29 is preferably formed to be 4 mm or less, as described above.

It is preferable that individual reflective units 21 to 29 are arranged at the same intervals, however, at least some of the reflective units 21 to 29 may be arranged in intervals different from those at which the other reflective units are arranged.

Furthermore, at least some of the reflective units 21 to with respect to the x axis may be inclined at an inclination angle different from the inclined angle at which the other reflective units are inclined.

Furthermore, at least some of the reflective units 21 to may be composed of half mirrors that partially reflect light.

Furthermore, at least some of the reflective units 21 to may be composed of refractive elements or diffractive elements other than reflective means.

Furthermore, at least some of the reflective units 21 to 29 may be composed of optical elements such as notch filters that selectively transmit light therethrough according to its wavelength.

Furthermore, at least some of the reflective units 21 to 29 may have a surface coated with a material that absorbs light without reflecting light and wherein the coated surface is opposite surface to a surface reflecting the augmented reality image light.

Moreover, at least some of the reflective units 21 to 29 may have curved surfaces. In this case, the curved surfaces may be concave surfaces or convex surfaces.

In this case, the shape of the reflective units 21 to 29 may be formed according to any one of the methods described with reference to FIGS. 15 and 16.

Figure 29:
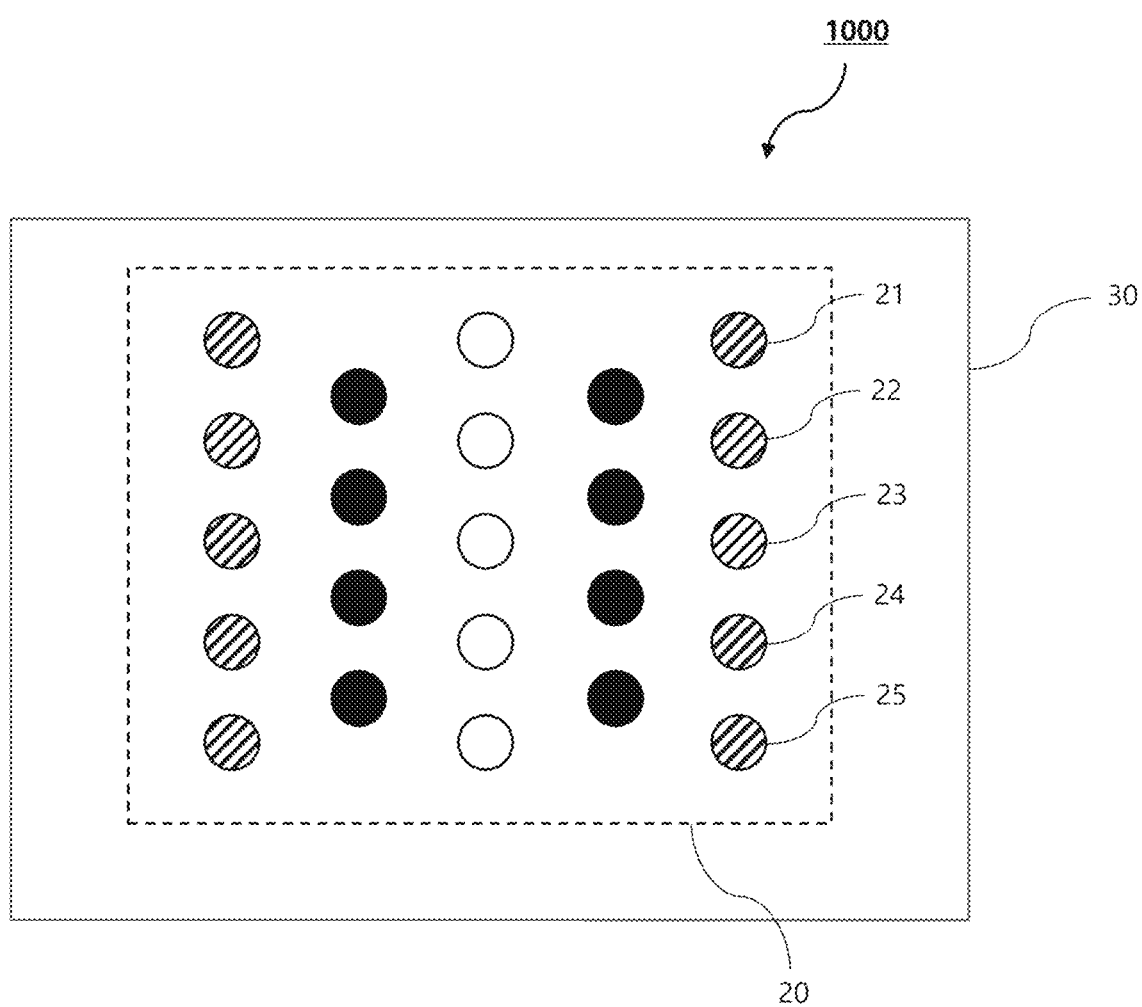
FIGS. 29 to 31 are diagrams showing the configuration of an optical device for augmented reality according to still another modification of the second embodiment of the present invention.
Figure 30:
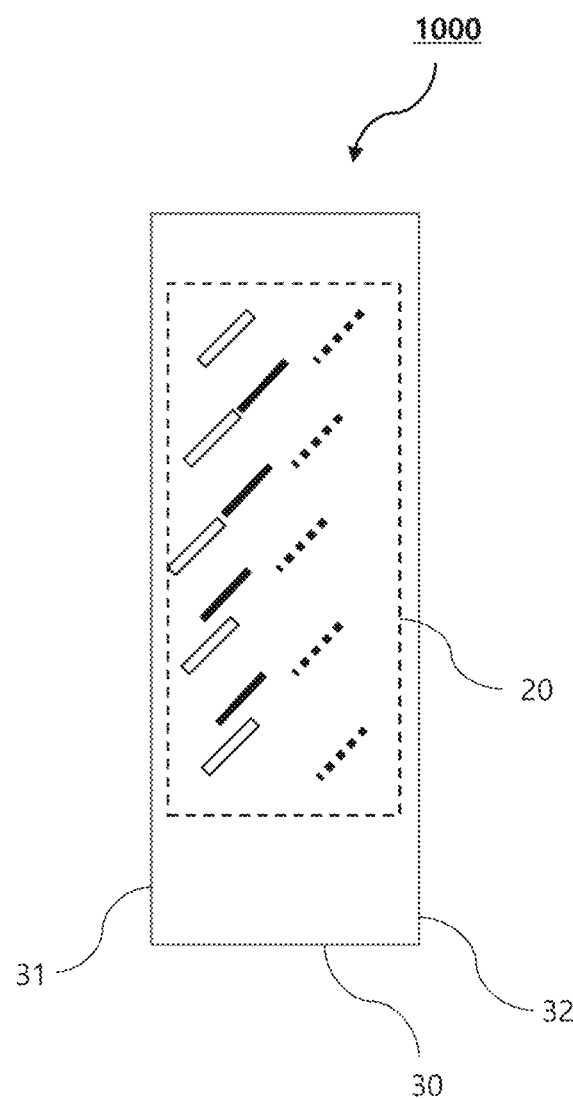
Figure 31:
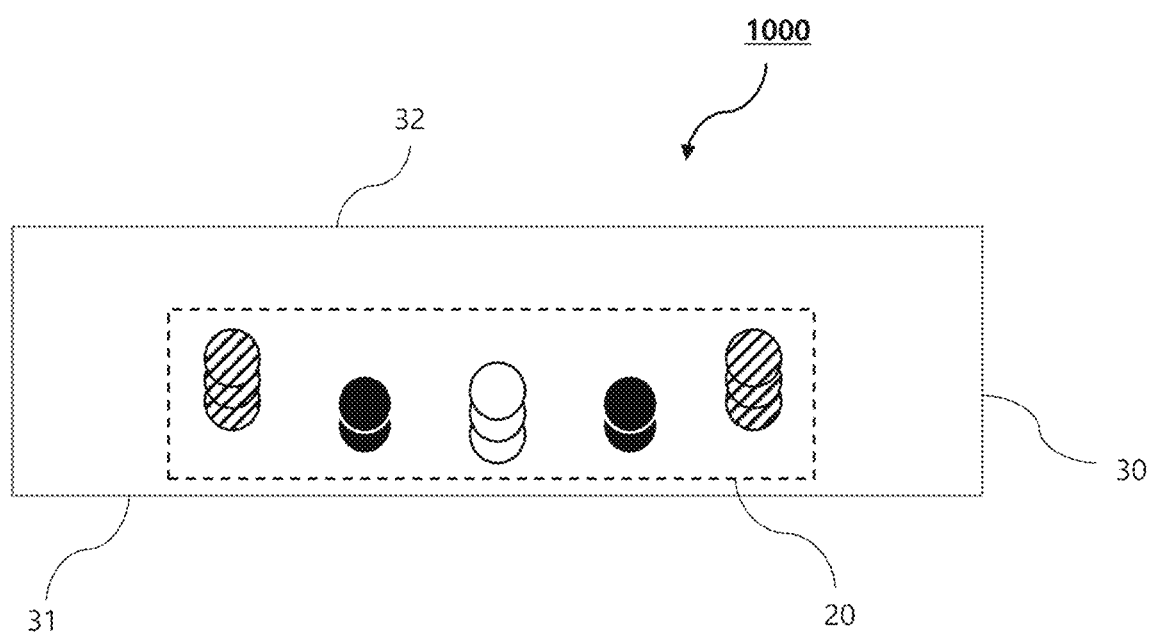

FIGS. 29 to 31 are diagrams showing the configuration of an optical device 1000 for augmented reality according to still another modification of the second embodiment of the present invention.

FIG. 29 is a front view showing an optical device 1000 for augmented reality that is viewed from the pupil 40, FIG. 30 is a side view of the optical device 1000 for augmented reality that is viewed in the z-axis direction as described above, and FIG. 31 is a plan view of the optical device 1000 for augmented reality that is viewed in the y-axis direction as described above.

The optical device 1000 for augmented reality shown in FIGS. 29 to 31 is the same as the optical device for augmented reality 700 shown in FIG. 26 in that a plurality of reflective means 20 are formed therein, however, the optical device 1000 is different from the optical device 700 shown in FIG. 26 in that there is at least one reflective means 20 that has a different distance to the first surface 31 of the optical means 30.

In other words, when the optical device 1000 for augmented reality or the optical means 30 is placed in front of the pupil 40 of a user, assuming that a forward direction from the pupil 40 is referred to as an x axis, any one of line segments being parallel to a vertical line from an image output unit 10 to the x axis along the x axis and passing between the first and second surfaces 31 and 32 of the optical means 30 is referred to as an y axis, and a line segment perpendicular to both the x axis and the y axis is referred to as an z axis, then there is at least one reflective means 20 that has a different distance to the first surface 31 of the optical means 30.

In other words, this means that at least part of the plurality of reflective means 20 is arranged so as not to be superimposed on the other reflective means 20 when the optical means 30 is viewed toward a plane perpendicular to the z-axis from outside, as shown in FIG. 30.

In the embodiments of FIGS. 29 to 31, the reflective means 20 are arranged such that the distance between two reflective means 20 indicated by diagonal lines and the first surface 31 of the optical means 30, the distance between two reflective means 20 indicated by a black color and the first surface 31 of the optical means 30, and the distance between one reflective means 20 indicated by a white color and the first surface 31 of the optical means 30 are different from one another.

Although the distance between each of the reflective means 20 indicated by diagonal lines and the first surface 31 of the optical means 30 are same to each other and the distance between each of the reflective means 20 indicated by a black color and the first surface 31 of the optical means 30 are same as to each other, this is an example. It is obvious that the reflective means 20 may be arranged such that the distances between the reflective means 20 and the first surface 31 of the optical means 30 are all different from one another.

It is obvious that the arrangement structure of the reflective means 20 according to the embodiment shown in FIGS. 29 to 31 may be applied to the first embodiment without change.

Figure 32:
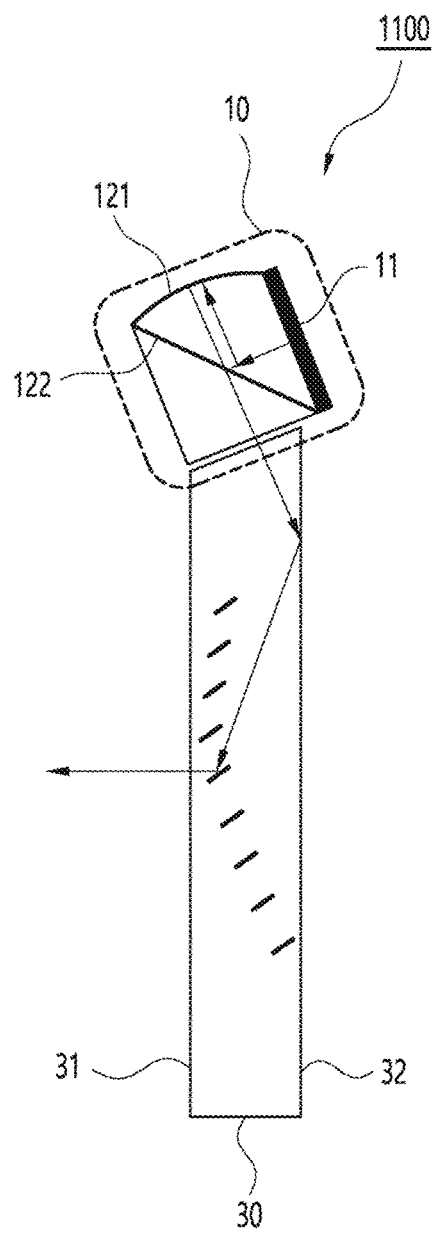
FIG. 32 is a diagram showing the configuration of an optical device for augmented reality according to still another modification of the second embodiment of the present invention.

FIG. 32 is a diagram showing the configuration of an optical device 1100 for augmented reality according to still another modification of the second embodiment of the present invention, which illustrates various configurations of an image output unit 10.

In the present invention, the image output unit 10 generally includes a display device 11 and a collimator 12, as described above. The collimator 12 of the image output unit 10 of the optical device 1100 for augmented reality shown in FIG. 32 is characterized in that it is implemented by combining a concave mirror 121 and a beam splitter 122.

As shown in FIG. 32, the augmented reality image light output from the display device 11 is transferred to the concave mirror 121 by the beam splitter 122, the augmented reality image light reflected from the concave mirror 121 enters the second surface 32 of the optical means 30 through the beam splitter 122, and then the entering augmented reality image light is transferred to the pupil 40 through the above-described process.

Figure 33:
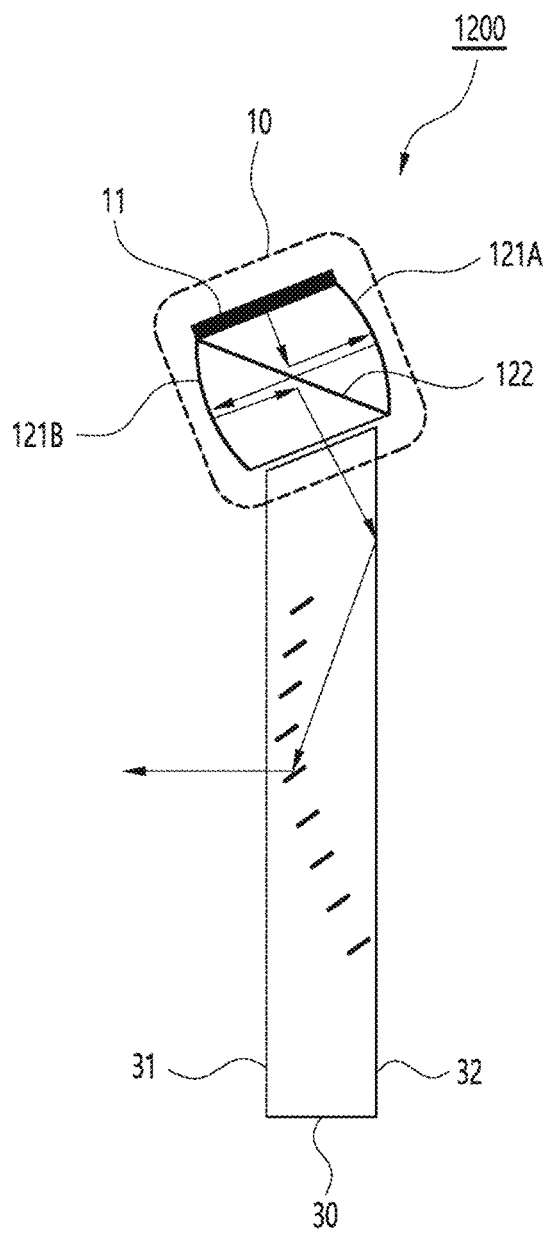
FIG. 33 is a diagram showing the configuration of an optical device for augmented reality according to still another modification of the second embodiment of the present invention.

FIG. 33 is a diagram showing the configuration of an optical device 1200 for augmented reality according to still another modification of the second embodiment of the present invention.

The optical device for augmented reality 1200 shown in FIG. 33 is similar to the embodiment shown in FIG. 32, and is characterized in that an image output unit 10 is constructed by arranging two concave mirrors 121 to be opposite to each other.

In other words, in the embodiment shown in FIG. 33, the augmented reality image light output from a display device 11 is transferred to one concave mirror 121A by a beam splitter 122, reflected from the concave mirror 121A, passed through the beam splitter 122, transferred to an opposite concave mirror 121B, reflected from the concave mirror 121B again, transferred to the second surface 32 of the optical means 30 through the beam splitter 122, and finally transferred to the pupil 40 through the above-described process.

Figure 34:
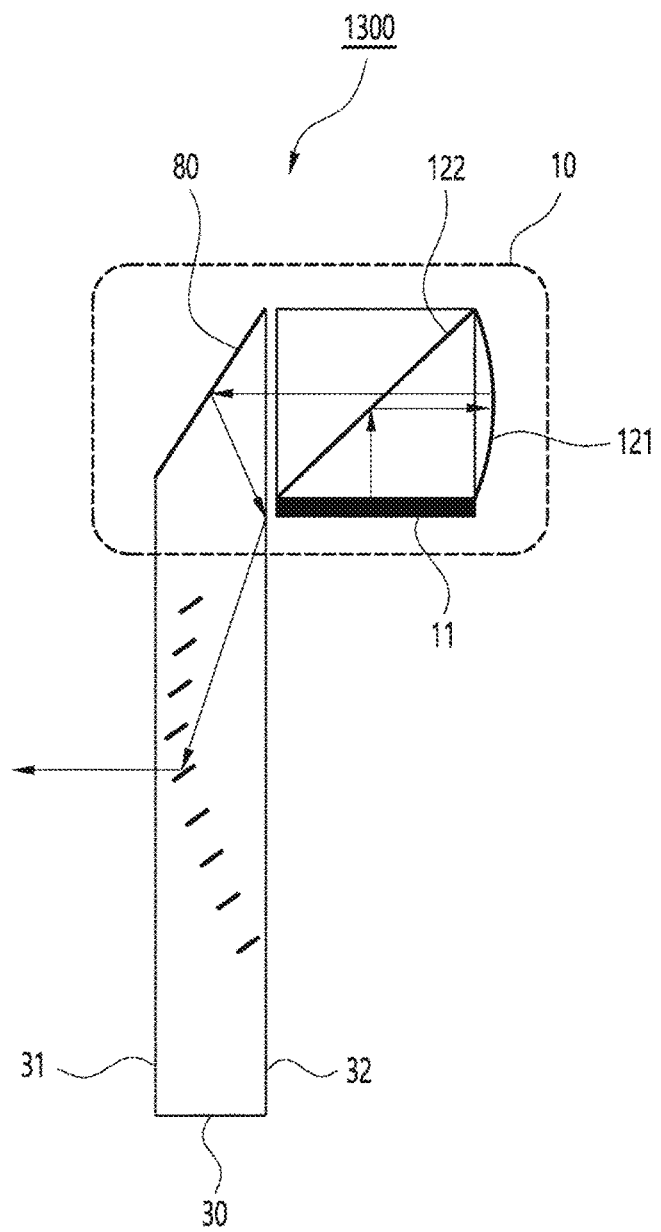
FIG. 34 is a diagram showing the configuration of an optical device for augmented reality according to still another modification of the second embodiment of the present invention.

FIG. 34 is a diagram showing the configuration of an optical device 1300 for augmented reality according to still another modification of the second embodiment of the present invention.

The embodiment shown in FIG. 34 is similar to the embodiment shown in FIG. 32, and is different from the embodiment shown in FIG. 32 in that the augmented reality image light output from an image output unit 10 is transferred to an optical means 30 via an auxiliary reflective unit 80.

In other words, in the embodiment shown in FIG. 34, the augmented reality image light output from a display device 11 is transferred to a concave mirror 121 by a beam splitter 122, the augmented reality image light reflected from the concave mirror 121 passes through the beam splitter 122, is transferred to the auxiliary reflective unit 80, is reflected from the auxiliary reflective unit 80, and is transferred to the second surface 32 of the optical means 30, and the transferred augmented reality image light is finally transferred to the pupil 40 through the above-described process.

The embodiments shown in FIGS. 32 to 34 illustrate examples of the configuration of the image output unit 10. It is obvious that the image output unit 10 may be constructed in various other forms.

Furthermore, it is obvious that the embodiments shown in FIGS. 32 to 34 may be applied to the above-described image output unit 10 of the first embodiment without change.

While the configuration of the present invention has been described with reference to some embodiments of the present invention, it is obvious that the present invention is not limited to the above embodiments and various modifications and alterations may be made by those skilled in the art without departing from the scope and spirit of the present invention.

For example, in the above embodiments, the optical devices 200 to 1300 for augmented reality may be fabricated independently of the image output unit 10, and thus the image output unit 10 has been described as being not an essential component for the optical devices 200 to 1300 for augmented reality. However, as described with reference to FIGS. 32 to 34, an implementation may be made in the form of an integrated module including the image output unit 10.

According to the present invention, there is provided the optical device for augmented reality, which is capable of improving the light efficiency of the augmented reality image light transferred to an eye box.

Furthermore, according to the present invention, there is provided the optical device for augmented reality, in which the reflective means for transferring the augmented reality image light, output from the image output unit, to the pupil is formed a curved arrangement structure close to a C shape, so that the light efficiency of the augmented reality image light transferred to an eye box is improved.

What is claimed is:

1. An optical device for augmented reality having improved light efficiency, the optical device comprising:
a reflector configured to transfer augmented reality image light, which is image light corresponding to an image for augmented reality output from an image output unit, to a pupil of an eye of a user by reflecting the augmented reality image light toward the pupil, thereby providing the image for augmented reality to the user; and
an optical lens adapted such that the reflector is embedded and disposed therein, and configured to transmit at least part of real object image light, which is image light output from a real object, therethrough toward the pupil of the eye of the user;
wherein the optical lens includes a first surface through which the augmented reality image light reflected from the reflector and at least part of the real object image light go toward the pupil of the user and a second surface being opposite to the first surface and into which the real object image light enters;
wherein the reflector includes a plurality of reflective units having a size of 4 mm or less that are embedded and arranged inside the optical lens to transfer the augmented reality image light, transferred to the reflector, to the pupil of the user by reflecting the augmented reality image light;
wherein at least two reflective units of the plurality of reflective units are arranged closer to the second surface of the optical lens as a distance from the image output unit increases; and wherein:
a plurality of reflectors are formed, and
when the optical device for augmented reality is placed in front of the pupil of the user, assuming that a forward direction from the pupil is referred to as an x axis, any one of line segments being parallel to a vertical line between the image output unit and the x axis along the x axis and passing between the first and second surfaces of the optical lens is referred to as an y axis and a line segment perpendicular to both the x axis and the y axis is referred to as an z axis, then each of the plurality of reflectors is arranged at intervals in parallel with each other along a z-axis direction.

2. The optical device of claim 1, wherein the augmented reality image light output from the image output unit is directly transferred to the reflector through an inside of the optical lens, or is totally reflected from an inner surface of the optical lens at least once and then transferred to the reflector.

3. The optical device of claim 1, wherein each of the plurality of reflective units is inclined at an angle of 45 degrees or less with respect to a forward direction from a center of the pupil of the user.

4. The optical device of claim 1, wherein the reflectors are arranged such that each of reflective units included in each of the reflectors is located along a virtual straight line parallel to the z axis along with any one of reflective units included in adjacent reflectors.

5. The optical device of claim 1, wherein the reflectors are arranged such that each of reflective units included in each of the reflectors is prevented from being located along a virtual straight line parallel to the z axis along with any one of reflective units included in adjacent reflectors.

6. The optical device of claim 1, wherein at least some of the reflective units have a different size.

7. The optical device of claim 1, wherein at least some of the reflective units are arranged at intervals different from intervals at which other reflective units are arranged.

8. The optical device of claim 1, wherein at least some of the reflective units are composed of at least any one of half mirrors, refractive elements, and diffractive elements.

9. The optical device of claim 1, wherein
at least some of the reflective units have a surface coated with a material that absorbs light without reflecting light, wherein the coated surface is opposite surface to a surface reflecting the augmented reality image light.

10. The optical device of claim 1, wherein at least some of the reflective units have surfaces formed as curved surfaces.

11. The optical device of claim 10, wherein the surfaces formed as curved surfaces are concave toward the first surface of the optical lens or convex toward the first surface of the optical lens.

12. The optical device of claim 10, wherein, when the reflective units are placed in front of the pupil of the user, assuming that a forward direction from the pupil is referred to as an x axis, any one of line segments being parallel to a vertical line between the image output unit and the x axis along the x axis and passing between the first and second surfaces of the optical lens is referred to as an y axis and a line segment perpendicular to both the x axis and the y axis is referred to as an z axis, then at least some of the reflective units are formed such that a length thereof in a z-axis direction is formed to be longer than a length thereof in an x-axis direction or such that a length thereof in a y-axis direction is formed to be longer than a length thereof in the z-axis direction.

13. The optical device of claim 12, wherein the reflective units formed such that the length thereof in the z-axis direction is formed to be longer than the length thereof in the x-axis direction or such that the length thereof in the y-axis direction is formed to be longer than the length thereof in the z-axis direction have surfaces formed as concave toward the first surface of the optical lens or as convex toward the first surface of the optical lens.

14. An optical device for augmented reality having improved light efficiency, the optical device comprising:
a reflector configured to transfer augmented reality image light, which is image light corresponding to an image for augmented reality output from an image output unit, to a pupil of an eye of a user by reflecting the augmented reality image light toward the pupil, thereby providing the image for augmented reality to the user; and
an optical lens adapted such that the reflector is embedded and disposed therein, and configured to transmit at least part of real object image light, which is image light output from a real object, therethrough toward the pupil of the eye of the user;
wherein the optical lens includes a first surface through which the augmented reality image light reflected from the reflector and at least part of the real object image light goes toward the pupil of the user and a second surface being opposite to the first surface and into which the real object image light enters;
wherein the reflector includes a plurality of reflective units having a size of 4 mm or less that are embedded and arranged inside the optical lens to transfer the augmented reality image light, transferred to the reflector, to the pupil of the user by reflecting the augmented reality image light;
wherein at least two reflective units of the plurality of reflective units are arranged closer to the second surface of the optical lens as a distance from the image output unit increases; and
wherein, when the optical device for augmented reality is placed in front of the pupil of the user, assuming that a forward direction from the pupil is referred to as an x axis, any one of line segments being parallel to a vertical line between the image output unit and the x axis along the x axis and passing between the first and second surfaces of the optical lens is referred to as an y axis and a line segment perpendicular to both the x axis and the y axis is referred to as an z axis, then each of the plurality of reflective units is formed in bar shapes extending in a z-axis direction.

15. An optical device for augmented reality having improved light efficiency, the optical device comprising:
a reflector configured to transfer augmented reality image light, which is image light corresponding to an image for augmented reality output from an image output unit, to a pupil of an eye of a user by reflecting the augmented reality image light toward the pupil, thereby providing the image for augmented reality to the user; and
an optical lens adapted such that the reflector is embedded and disposed therein, and configured to transmit at least part of real object image light, which is image light output from a real object, therethrough toward the pupil of the eye of the user;
wherein the optical lens includes a first surface through which the augmented reality image light reflected from the reflector and at least part of the real object image light go toward the pupil of the user, and a second surface being opposite to the first surface and into which the real object image light enters;

wherein the reflector includes a plurality of reflective units having a size of 4 mm or less that are embedded and arranged inside the optical lens to transfer the augmented reality image light, transferred to the reflector, to the pupil of the user by reflecting the augmented reality image light;

wherein the reflector includes a first reflective unit group comprising reflective units embedded and arranged inside the optical lens so that the reflective units are arranged closer to the first surface of the optical lens as a distance from the image output unit increases, and a second reflective unit group comprising reflective units embedded and arranged inside the optical lens so that the reflective units are arranged farther from the first surface of the optical lens as a distance from the image output unit increases; and wherein the first reflective unit group and the second reflective unit group are arranged such that a distance between the second reflective unit group and the image output unit is larger than a distance between the first reflective unit group and the image output unit.

16. The optical device of claim 15, wherein the augmented reality image light output from the image output unit is directly transferred to the reflector through an inside of the optical lens, or is totally reflected from an inner surface of the optical lens at least once and then transferred to the reflector.

17. The optical device of claim 15, wherein each of the plurality of reflective units is inclined at an angle of 45 degrees or less with respect to a forward direction from a center of the pupil of the user.

18. The optical device of claim 15, wherein:
a plurality of reflectors are formed; and
when the optical device for augmented reality is placed in front of the pupil of the user, assuming that a forward direction from the pupil is referred to as an x axis, any one of line segments being parallel to a vertical line from the image output unit to the x axis along the x axis and passing between the first and second surfaces of the optical lens is referred to as an y axis and a line segment perpendicular to both the x axis and the y axis is referred to as an z axis, then the each of the plurality of reflectors is arranged at intervals in parallel with each other along a z-axis direction.

19. The optical device of claim 18, wherein the reflectors are arranged such that each of reflective units included in each of the reflectors is located along a virtual straight line parallel to the z axis along with any one of reflective units included in adjacent reflectors.

20. The optical device of claim 18, wherein the reflectors are arranged such that each of reflective units included in each of the reflectors is prevented from being located along a virtual straight line parallel to the z axis along with any one of reflective units included in adjacent reflectors.

21. The optical device of claim 15, wherein, when the optical device for augmented reality is placed in front of the pupil of the user, assuming that a forward direction from the pupil is referred to as an x axis, any one of line segments being parallel to a vertical line between the image output unit and the x axis along the x axis and passing between the first and second surfaces of the optical lens is referred to as an y axis and a line segment perpendicular to both the x axis and the y axis is referred to as an z axis, then each of the plurality of reflective units is formed in bar shapes extending in a z-axis direction.

22. The optical device of claim 15, wherein at least some of the plurality of reflective units are composed of at least any one of half mirrors, refractive elements, and diffractive elements.

23. The optical device of claim 15, wherein at least some of the reflective units have a surface coated with a material that absorbs light without reflecting light, wherein the coated surface is opposite surface to a surface reflecting the augmented reality image light.

24. The optical device of claim 15, wherein at least some of the plurality of reflective units have surfaces formed as curved surfaces.

25. The optical device of claim 24, wherein, when the optical device for augmented reality is placed in front of the pupil of the user, assuming that a forward direction from the pupil is referred to as an x axis, any one of line segments being parallel to a vertical line from the image output unit to the x axis along the x axis and passing between the first and second surfaces of the optical lens is referred to as an y axis and a line segment perpendicular to both the x axis and the y axis is referred to as an z axis, then at least some of the plurality of reflective units are formed such that a length thereof in a z-axis direction is formed to be longer than a length thereof in an x- or y-axis direction or such that a length thereof in the x- or y-axis direction is formed to be longer than a length thereof in the z-axis direction.

26. The optical device of claim 25, wherein the reflective units have surfaces formed as concave toward the first surface of the optical lens or as convex toward the first surface of the optical lens.

27. The optical device of claim 15, wherein:
a plurality of reflectors are formed; and
when the optical device for augmented reality is placed in front of the pupil of the user, assuming that a forward direction from the pupil is referred to as an x axis, any one of line segments being parallel to a vertical line from the image output unit to the x axis along the x axis and passing between the first and second surfaces of the optical lens is referred to as an y axis and a line segment perpendicular to both the x axis and the y axis is referred to as an z axis, then there is at least one reflector that has a different distance to the first surface of the optical lens.

* * * * *